United States Patent
Kawasumi

(10) Patent No.: US 11,252,295 B2
(45) Date of Patent: Feb. 15, 2022

(54) SHEET FEEDING DEVICE, IMAGE READING APPARATUS AND IMAGE FORMING APPARATUS

(71) Applicant: CANON KABUSHIKI KAISHA, Tokyo (JP)

(72) Inventor: Takuya Kawasumi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/140,163

(22) Filed: Jan. 4, 2021

(65) Prior Publication Data

US 2021/0250455 A1 Aug. 12, 2021

(30) Foreign Application Priority Data

Feb. 7, 2020 (JP) .............................. JP2020-020191

(51) Int. Cl.
| | |
|---|---|
| *H04N 1/04* | (2006.01) |
| *H04N 1/00* | (2006.01) |
| *B65H 1/06* | (2006.01) |
| *B65H 3/34* | (2006.01) |

(52) U.S. Cl.
CPC .......... *H04N 1/00615* (2013.01); *B65H 1/06* (2013.01); *B65H 3/34* (2013.01); *H04N 1/00604* (2013.01)

(58) Field of Classification Search
CPC .. H04N 1/00615; H04N 1/00604; B65H 1/06; B65H 3/34
USPC .................................................. 358/498, 496
See application file for complete search history.

(56) References Cited

U.S. PATENT DOCUMENTS

| | | | | |
|---|---|---|---|---|
| 6,859,638 | B2* | 2/2005 | Nobe ...................... | B65H 1/02 271/3.01 |
| 7,389,984 | B2* | 6/2008 | Tsai ......................... | B65H 1/04 271/145 |
| 7,469,893 | B2* | 12/2008 | Yamada ................... | B65H 1/04 271/171 |
| 7,780,162 | B2* | 8/2010 | Kaneko .................. | B65H 31/20 271/171 |
| 7,832,726 | B2* | 11/2010 | Osakabe ................. | B65H 7/02 271/261 |
| 7,845,632 | B2* | 12/2010 | Windsor ................. | B65H 1/04 271/171 |
| 8,020,854 | B2* | 9/2011 | Hayakawa .............. | B65H 1/04 271/171 |
| 9,079,731 | B2* | 7/2015 | Takahata .............. | B65H 3/5223 |
| 9,254,972 | B2* | 2/2016 | Ukai ....................... | B65H 1/04 |
| 9,469,493 | B2* | 10/2016 | Chen ..................... | B65H 31/20 |

(Continued)

FOREIGN PATENT DOCUMENTS

JP 2018-008766 A 1/2018

*Primary Examiner* — Cheukfan Lee
(74) *Attorney, Agent, or Firm* — Venable LLP

(57) ABSTRACT

A sheet feeding device includes a stacking tray, a feeding portion, a first restricting member which includes a first restricting surface and a first supporting portion, a second restricting member which includes a second restricting surface and a second supporting portion, and an interrelating portion. In a state in which the first restricting surface and the second restricting surface are brought closest to each other, a part of the first restricting portion is positioned on a second restricting surface side with respect to a center line of the stacking tray, and a part of the second restricting portion is positioned on a first restricting surface side with respect to the center line.

14 Claims, 12 Drawing Sheets

(56) References Cited

U.S. PATENT DOCUMENTS

| | | | | |
|---|---|---|---|---|
| 9,555,984 B2* | 1/2017 | Takahata | ............... | B65H 1/04 |
| 10,160,612 B2 | 12/2018 | Kawanishi et al. | | |
| 10,274,878 B2* | 4/2019 | Suzuki | ............... | G03G 15/2042 |
| 10,459,394 B2* | 10/2019 | Morita | ............... | B65H 1/04 |
| 2006/0180998 A1* | 8/2006 | Lee | ............... | B65H 1/266 |
| | | | | 271/171 |
| 2007/0063420 A1* | 3/2007 | Seike | ............... | B65H 3/46 |
| | | | | 271/109 |
| 2007/0164502 A1* | 7/2007 | Komai | ............... | B65H 1/04 |
| | | | | 271/145 |
| 2012/0205859 A1* | 8/2012 | Nishioka | ............... | B65H 1/04 |
| | | | | 271/145 |
| 2015/0207941 A1* | 7/2015 | Koda | ............... | H04N 1/00702 |
| | | | | 358/3.26 |
| 2015/0344244 A1* | 12/2015 | Koga | ............... | B65H 1/04 |
| | | | | 271/264 |
| 2018/0009613 A1 | 1/2018 | Kawanishi et al. | | |
| 2019/0329996 A1* | 10/2019 | Anami | ............... | H04N 1/00615 |
| 2021/0218856 A1* | 7/2021 | Okawa | ............... | H04N 1/00687 |

* cited by examiner (a)

(b)

(a)

(b)

(a)

(b)

SHEET FEEDING DEVICE, IMAGE READING APPARATUS AND IMAGE FORMING APPARATUS

FIELD OF THE INVENTION AND RELATED ART

The present invention relates to a sheet feeding device, an image reading apparatus and an image forming apparatus which includes a stacking tray for stacking a sheet and include a first restricting member and a second restricting member which restrict a position of the sheet with respect to a widthwise direction of the sheet.

Conventionally, in an image forming apparatus such as a copying machine or a multi-function machine, an automatic document feeder (ADF) for feeding an original, which is a sheet, to an image reading portion is provided in some instances. In an ADF disclosed in Japanese Laid-Open Patent Application 2018-8766, an original tray for stacking an original (sheet) is provided with two side restricting plates (side guiding mechanisms) for restricting a widthwise position of the original in contact with opposite ends of end portions of the original with respect to a widthwise direction of the original. A user stacks the original on the original tray and slides (moves) the two side restricting plates so as to contact the side ends (end portions) of the original. By this, a widthwise position of the original set on the original tray (stacking tray) is restricted, so that an attitude of the original when the original is fed and an image on the original is read by an image reading apparatus can be satisfactorily maintained.

Each of the side restricting plates as described above, includes a restricting surface contacting a side end (portion) of the original and a supporting portion for supporting the restricting surface in contact with an upper surface of the stacking tray. The supporting portion is provided inside the side restricting plate with respect to the widthwise direction of the sheet.

In recent years, there is a demand such that a user wishes to read an original, such as a business card or a receipt, small in size with respect to a widthwise direction of the original (sheet), through the ADF. In this case, in order to restrict the side ends of the original small in size with respect to the widthwise direction, there is a need that the two side restricting plates are brought near to each other with respect to the widthwise direction. For that purpose, there is a need that a length of each of the supporting portions with respect to the widthwise direction is made short.

However, in the case where the length of the supporting portions with respect to the widthwise direction is made short, a degree of inclination of the restricting surfaces becomes large by the influence of variations in dimension and tolerance of constituent component parts. In the case where the supporting portions are inclined inward between the two side restricting plates, when a bundle of originals is set on the stacking tray, the originals are sandwiched between the two side restricting plates particularly at upper portions of the restricting surfaces. In this case, a feeding resistance when the sheet (original) is fed becomes large, so that there is a liability that improper feeding is caused. On the other hand, in the case where the restricting surfaces are inclined outward with respect to the two side restricting plates, a gap is formed between the widthwise end of the original and the associated restricting surface particularly at the upper portion of the restricting surface. In this case, there is a liability that the original is inclined with respect to a feeding direction thereof and thus causes oblique movement thereof during feeding.

SUMMARY OF THE INVENTION

A principal object of the present invention is to provide a sheet feeding device, an image reading apparatus and an image forming apparatus which are capable of reducing a degree of occurrences of improper feeding and oblique movement of a sheet small in size with respect to a widthwise direction of the sheet.

According to an aspect of the present invention, there is provided a sheet feeding device comprising: a stacking tray configured to stack a sheet; a feeding portion configured to feed the sheet stacked on the stacking tray; a first restricting member which includes a first restricting surface for restricting one end side of the sheet provided on an upper surface of the stacking tray and a first supporting portion for supporting the first restricting surface in contact with the upper surface of the stacking tray and which is movable in a widthwise direction of the sheet perpendicular to a feeding direction of the sheet; a second restricting member which includes a second restricting surface for restricting the other end side of the sheet, opposite from the one end side of the sheet, provided on the upper surface of the stacking tray and a second supporting portion for supporting the second restricting surface in contact with the upper surface of the stacking tray and which is movable in the widthwise direction of the sheet perpendicular to the feeding direction of the sheet; and interrelating means configured to interrelate the first restricting member and the second restricting member with each other so that with respect to the widthwise direction of the sheet, a distance from a center line, of the stacking tray, extending in the feeding direction of the sheet to the first restricting surface and a distance from the center line to the second restricting surface are equal to each other, wherein in a state in which the first restricting surface and the second restricting surface are brought closest to each other, a part of the first supporting portion is positioned on a second restricting surface side with respect to the center line, and a part of the second supporting portion is positioned on a first restricting surface side with respect to the center line.

Further features of the present invention will become apparent from the following description of exemplary embodiments with reference to the attached drawings.

Figure 2:
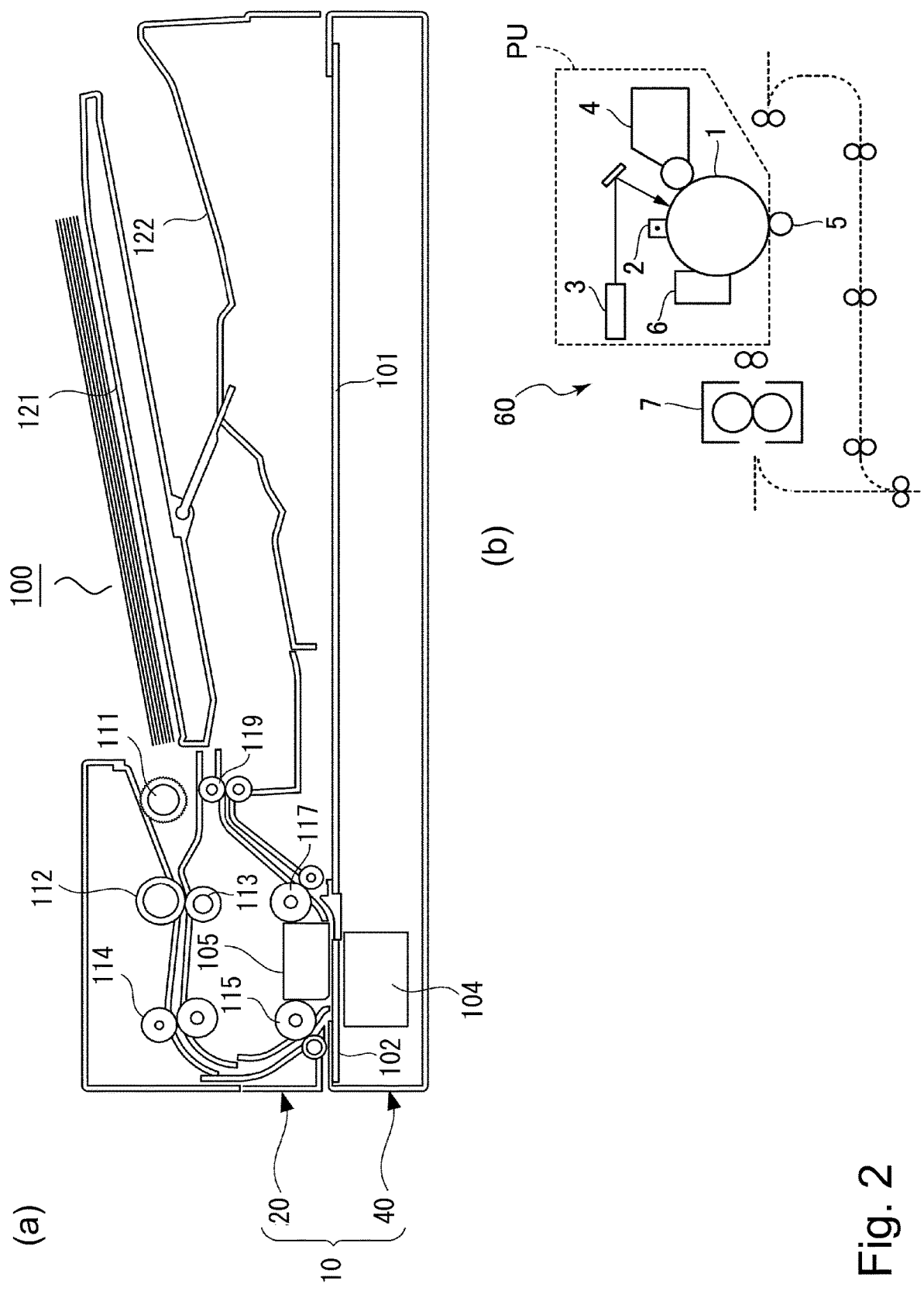

Part (a) of FIG. 2 is a schematic sectional view showing an image reading apparatus provided with an ADF in the first embodiment, and part (b) of FIG. 2 is a schematic view showing an image forming portion.

Figure 3:
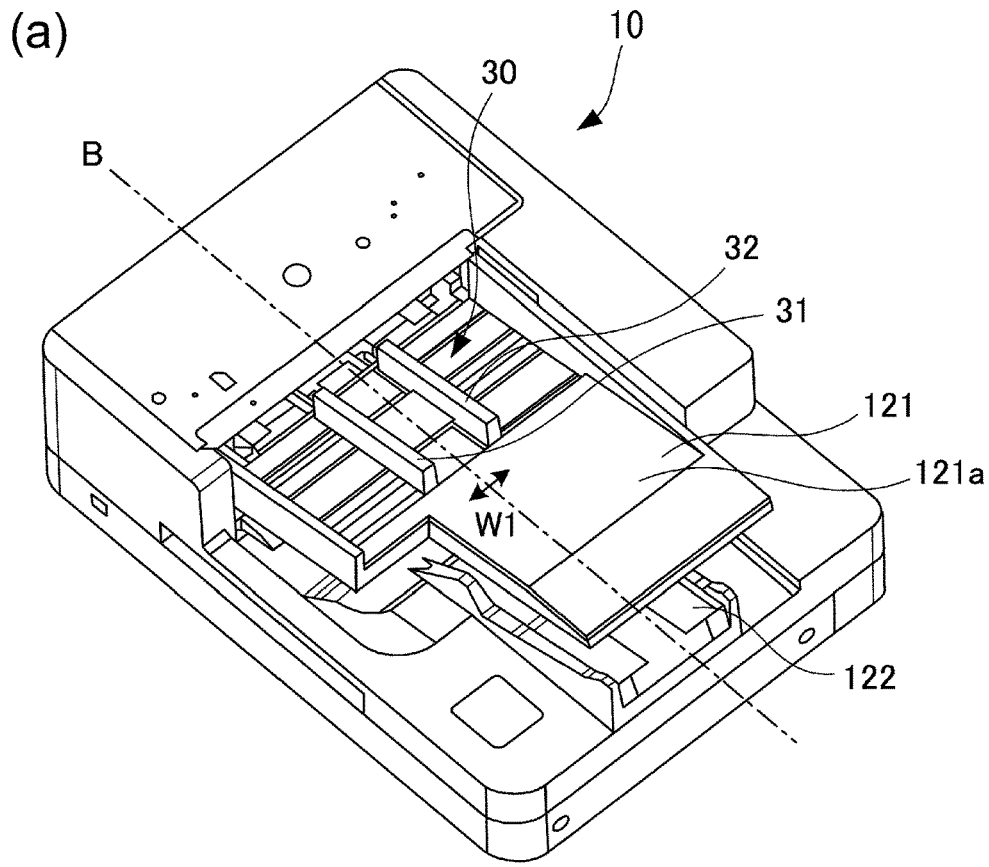
Figure 3:
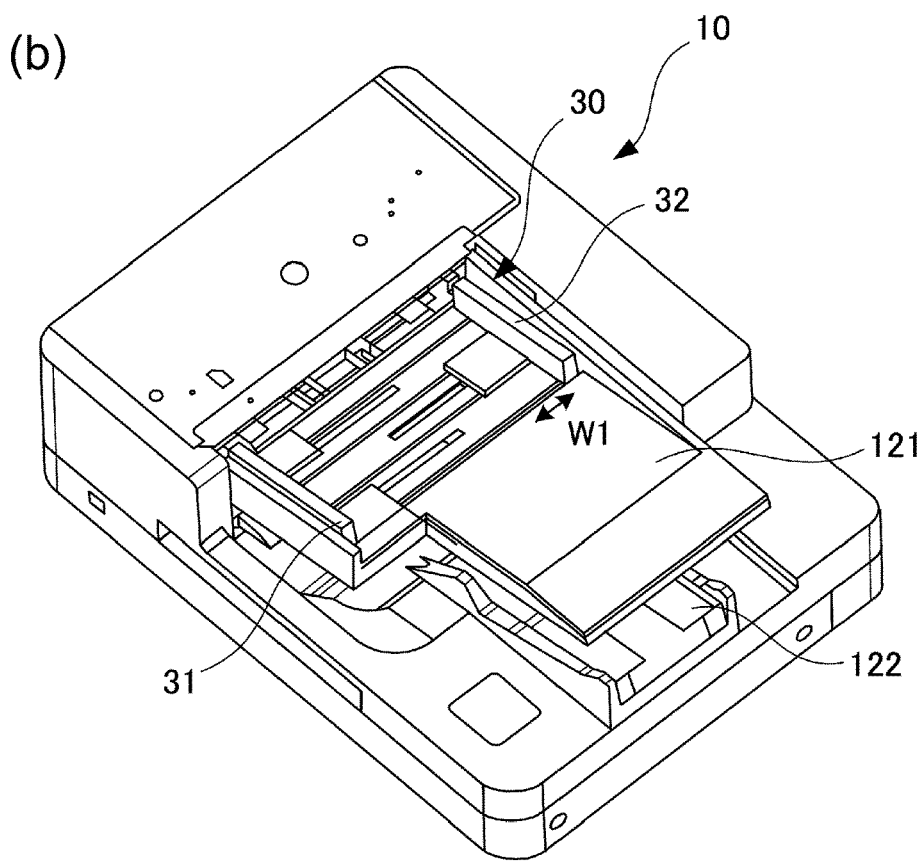

Part (a) of FIG. 3 is a perspective view of an entire ADF in a state in which a first side restricting plate and a second side restricting plate in the first embodiment are closed, and part (b) of FIG. 3 is a perspective view of the entire ADF in a state in which the first side restricting plate and the second side restricting plate in the first embodiment are opened.

Figure 4:
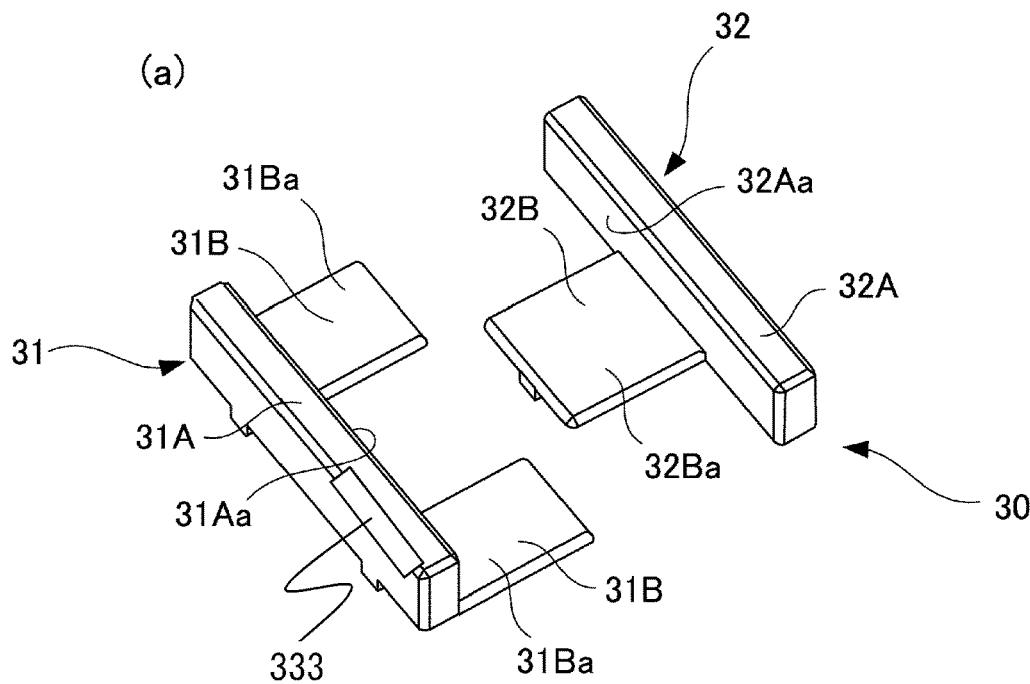
Figure 4:
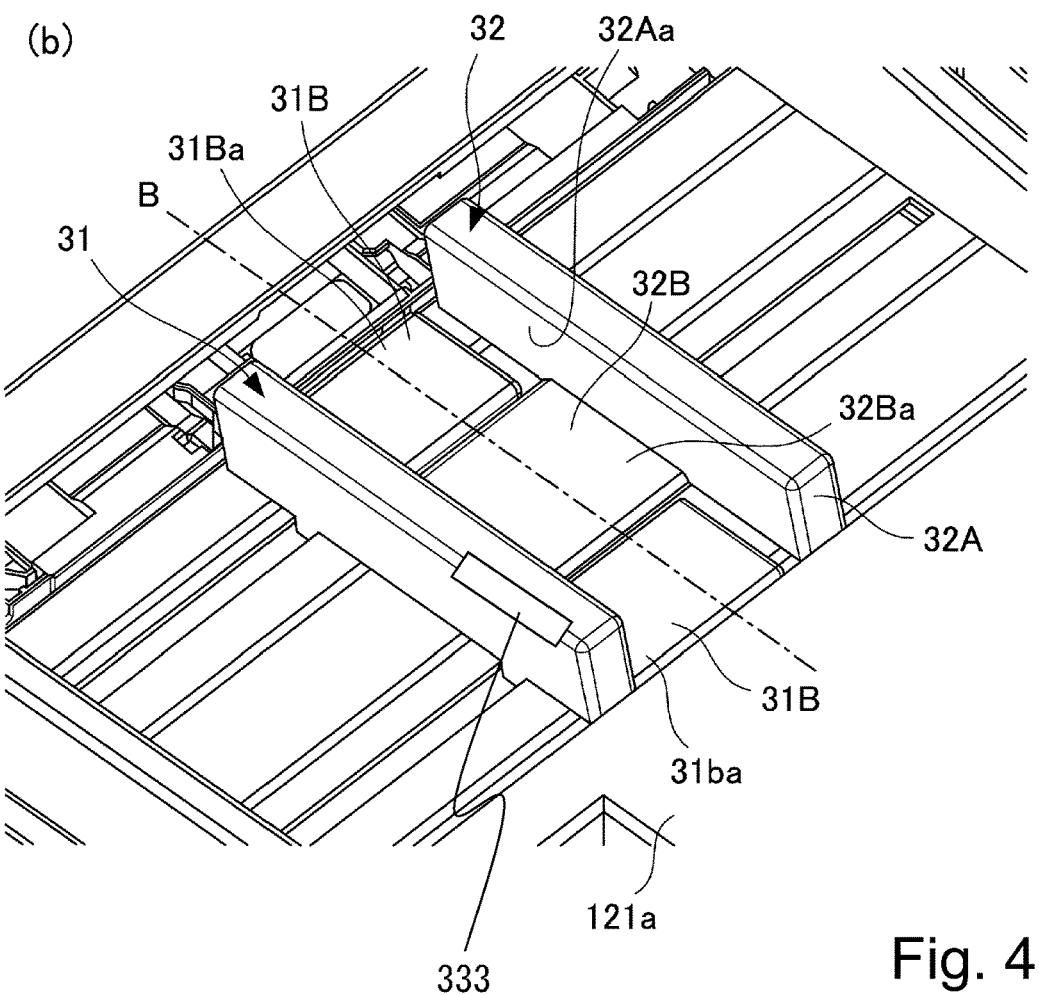

Part (a) of FIG. 4 is a perspective view showing entirety of the first side restricting plate and the second side restricting plate in the first embodiment, and part (b) of FIG. 4 is an enlarged perspective view showing the state in which the first side restricting plate and the second side restricting plate in the first embodiment are closed.

Figure 5:
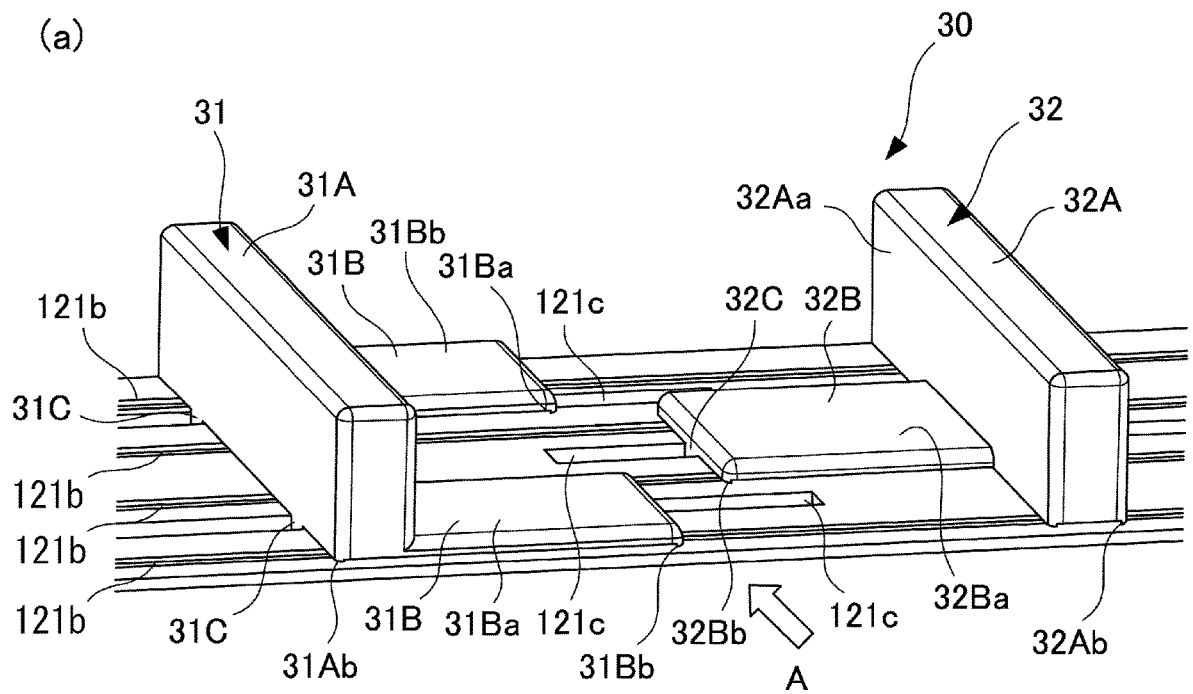
Figure 5:
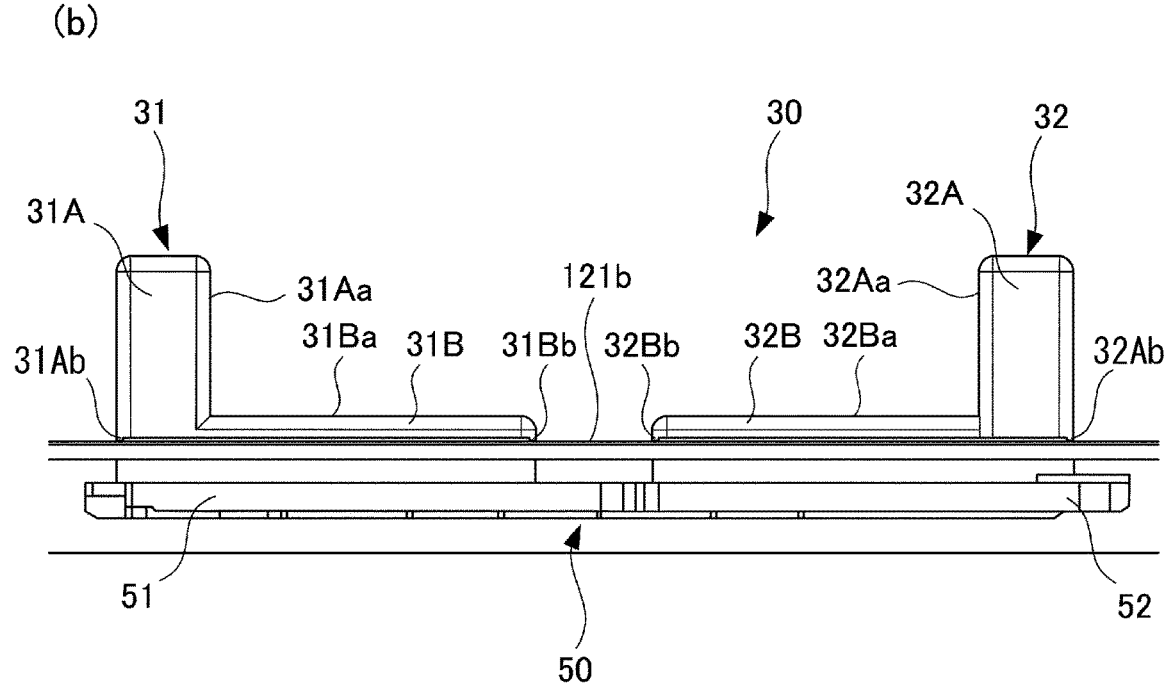

Part (a) of FIG. 5 is an enlarged perspective view showing a state in which the first side restricting plate and the second side restricting plate in the first embodiment are provided on a stacking tray, and part (b) of FIG. 5 is a side view of the first side restricting plate and the second side restricting plate as seen in an arrow A direction of part (a) of FIG. 5.

Figure 6:
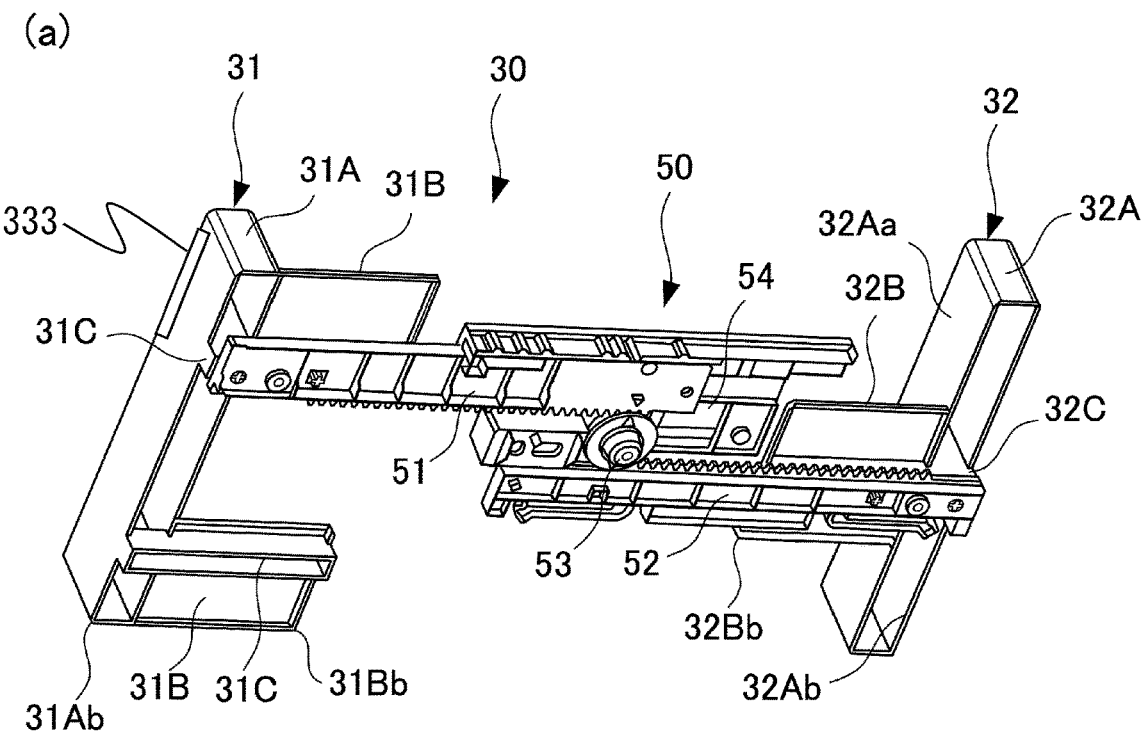
Figure 6:
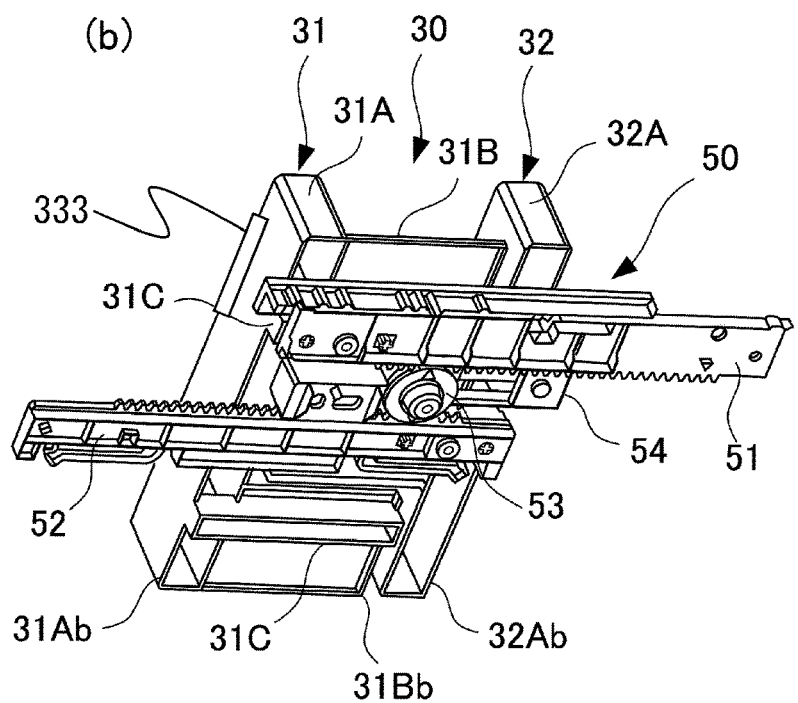

Part (a) of FIG. 6 is a perspective view showing a side restricting mechanism in the state in which the first side restricting plate and the second side restricting plate are opened, and part (b) of FIG. 6 showing the side restricting mechanism in the state in which the first side restricting plate and the second side restricting plate are closed.

Figure 7:
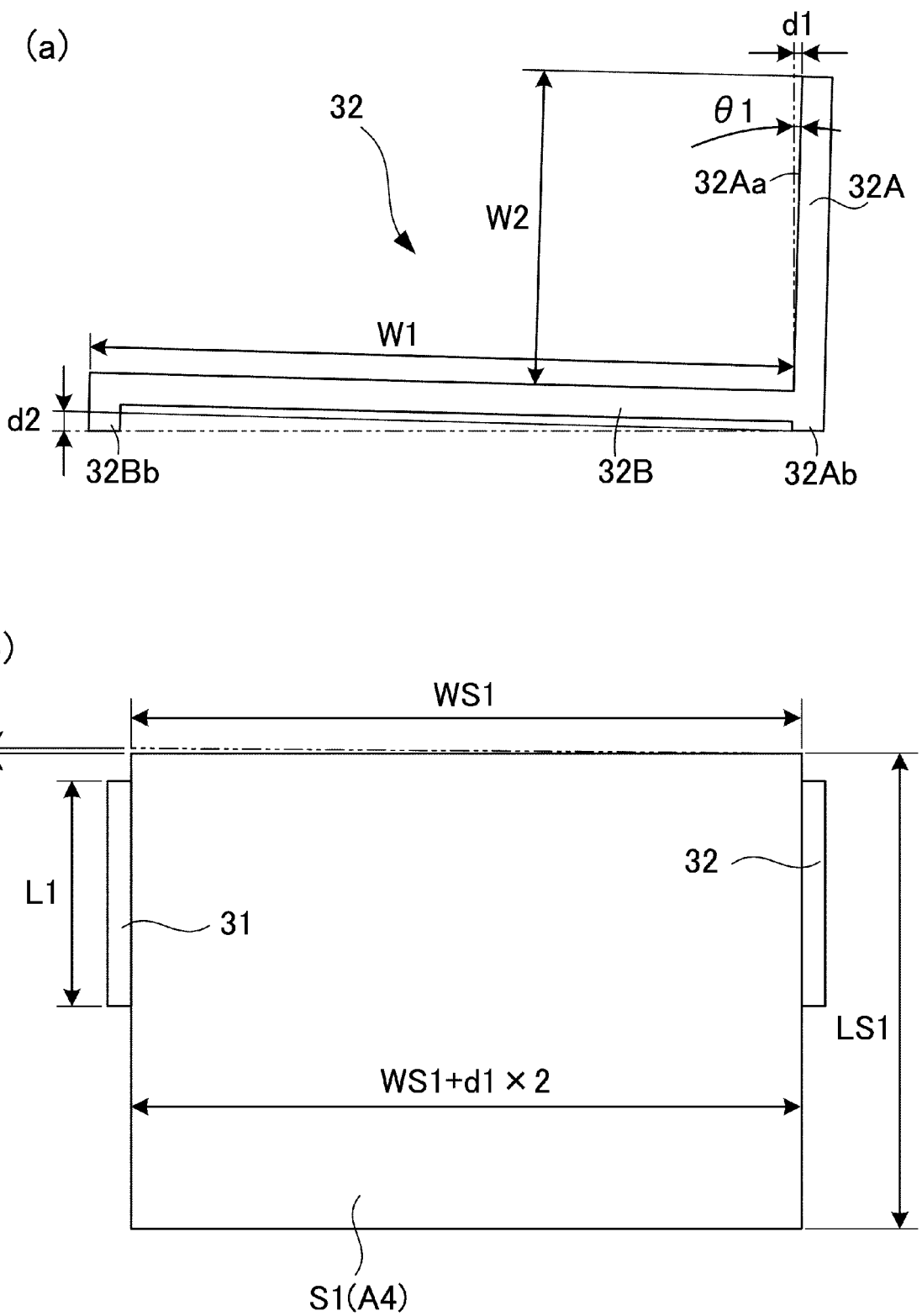

Part (a) of FIG. 7 is a schematic sectional view showing a relationship between a part tolerance, inclination of a restricting surface, and a positional tolerance of the restricting surface in the second side restricting plate in the first embodiment, and part (b) of FIG. 7 is a schematic top plan view showing a relationship between a set original and a positional tolerance between a first restricting surface and a second restricting surface in the first embodiment.

Figure 8:
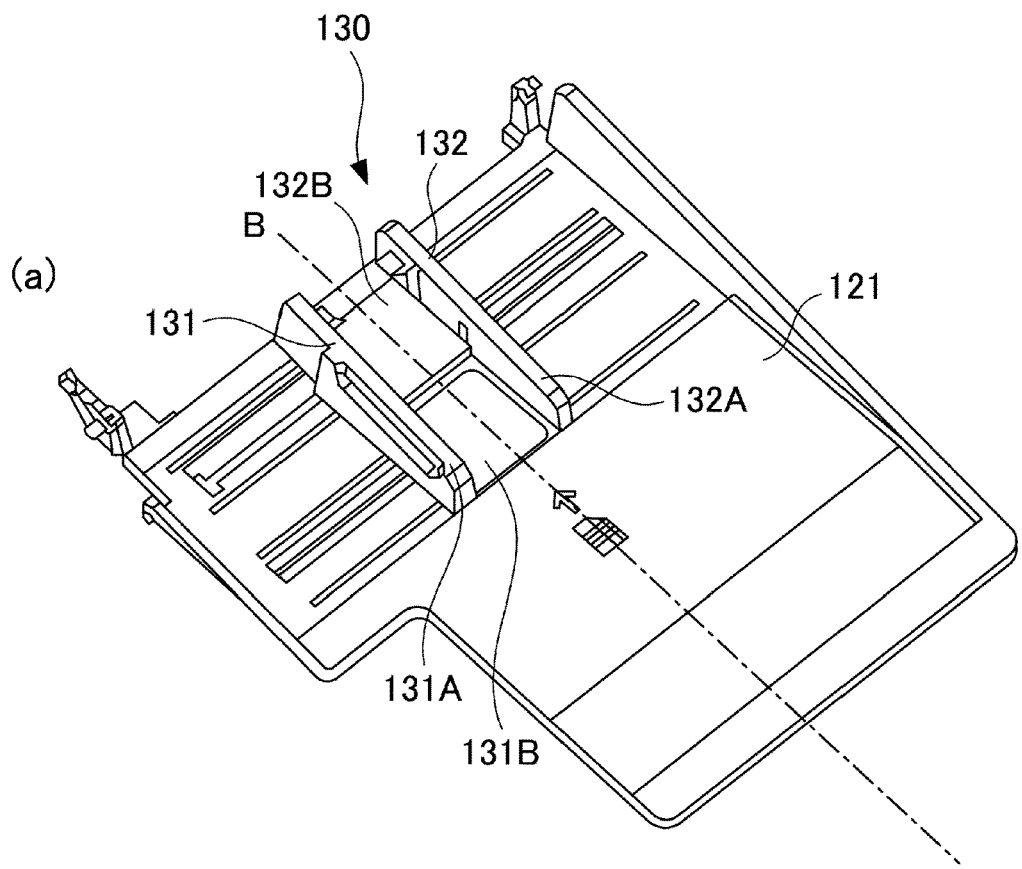
Figure 8:
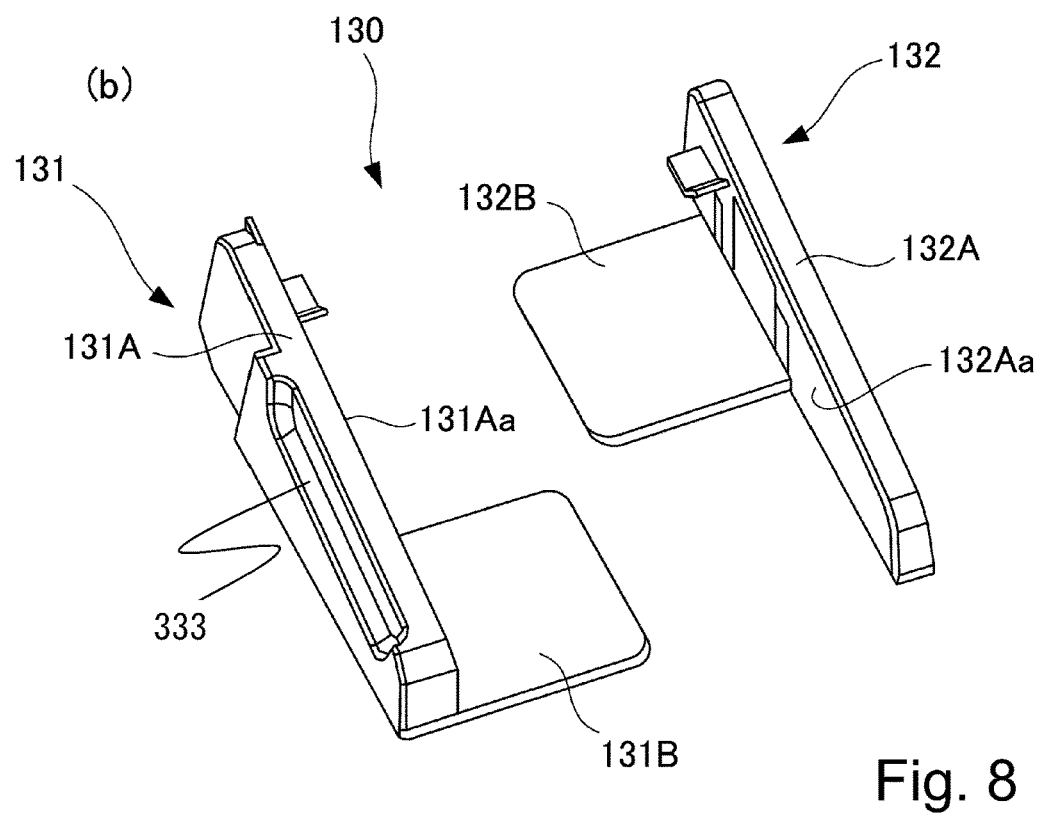

Part (a) of FIG. 8 is a perspective view of an entire ADF in a state in which a first side restricting plate and a second side restricting plate in a second embodiment are closed, and part (b) of FIG. 8 is a perspective view showing the first side restricting plate and the second side restricting plate in the second embodiment.

Figure 9:
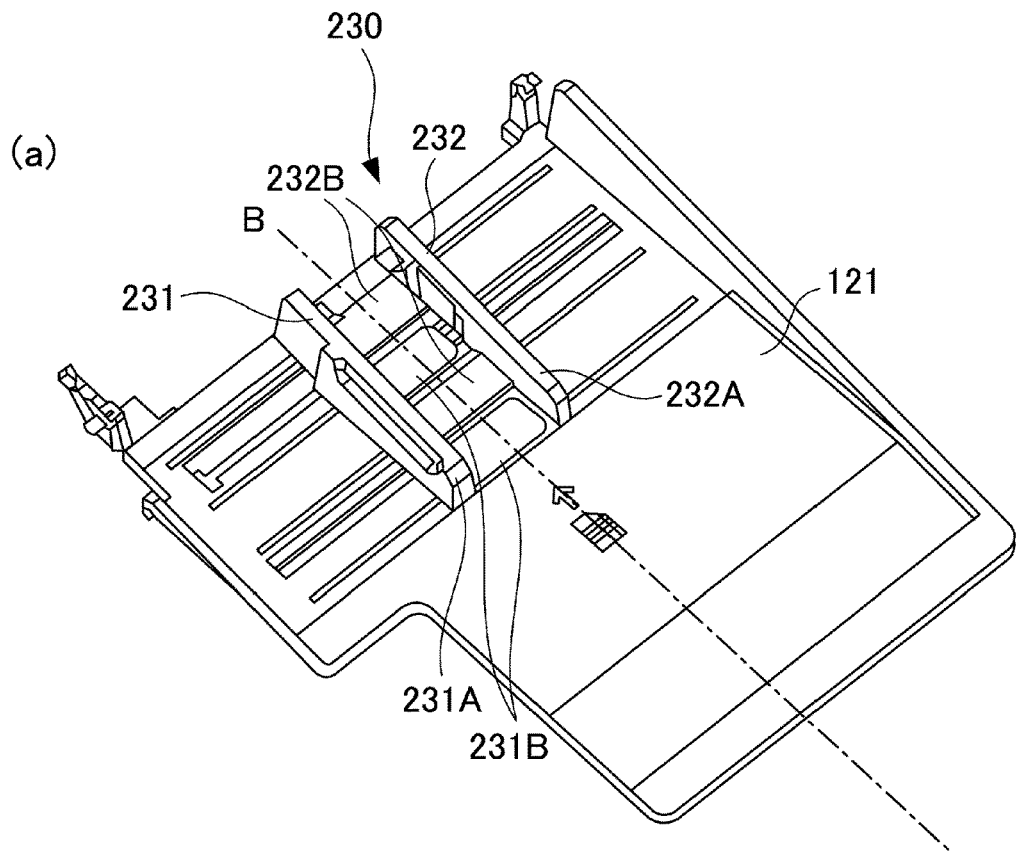
Figure 9:
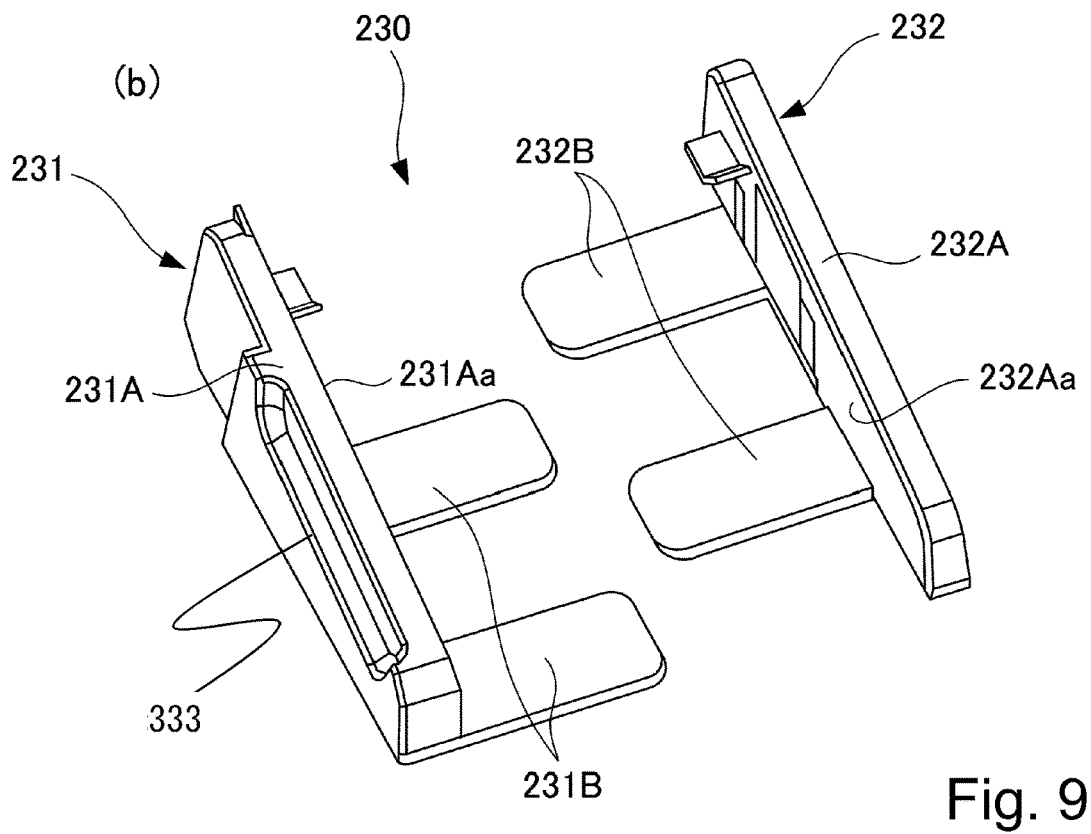

Part (a) of FIG. 9 is a perspective view of an entire ADF in a state in which a first side restricting plate and a second side restricting plate in a third embodiment are closed, and part (b) of FIG. 9 is a perspective view showing the first side restricting plate and the second side restricting plate in the third embodiment.

Figure 10:
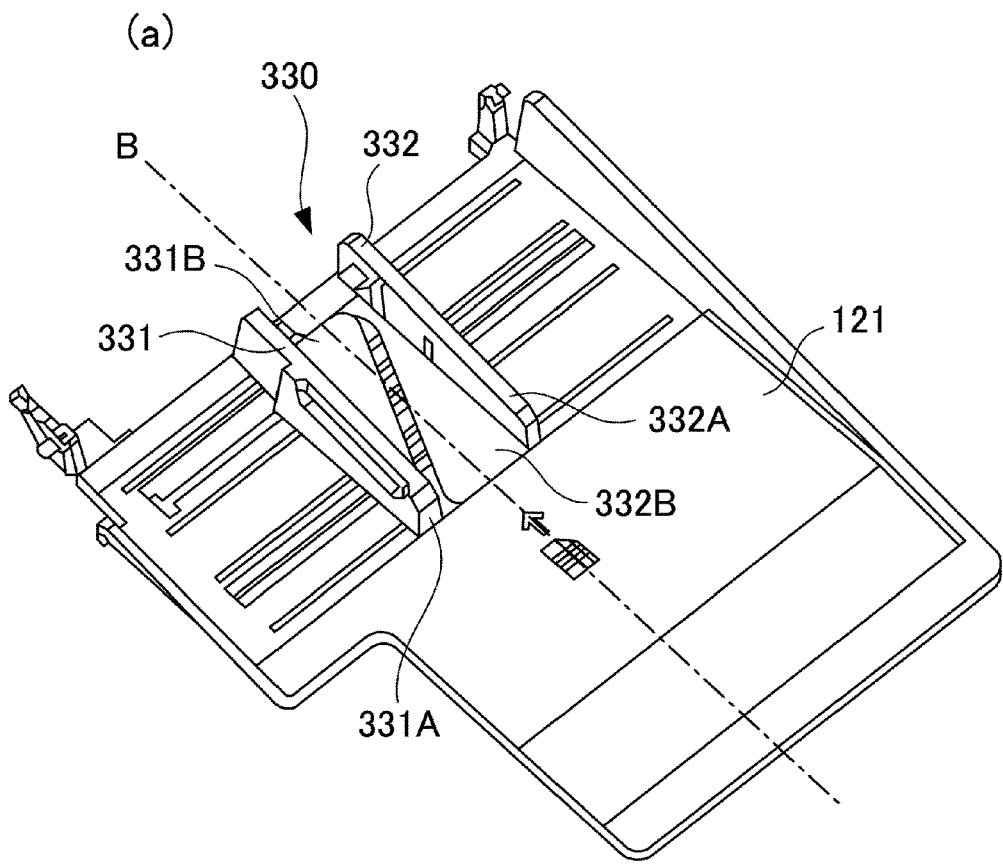
Figure 10:
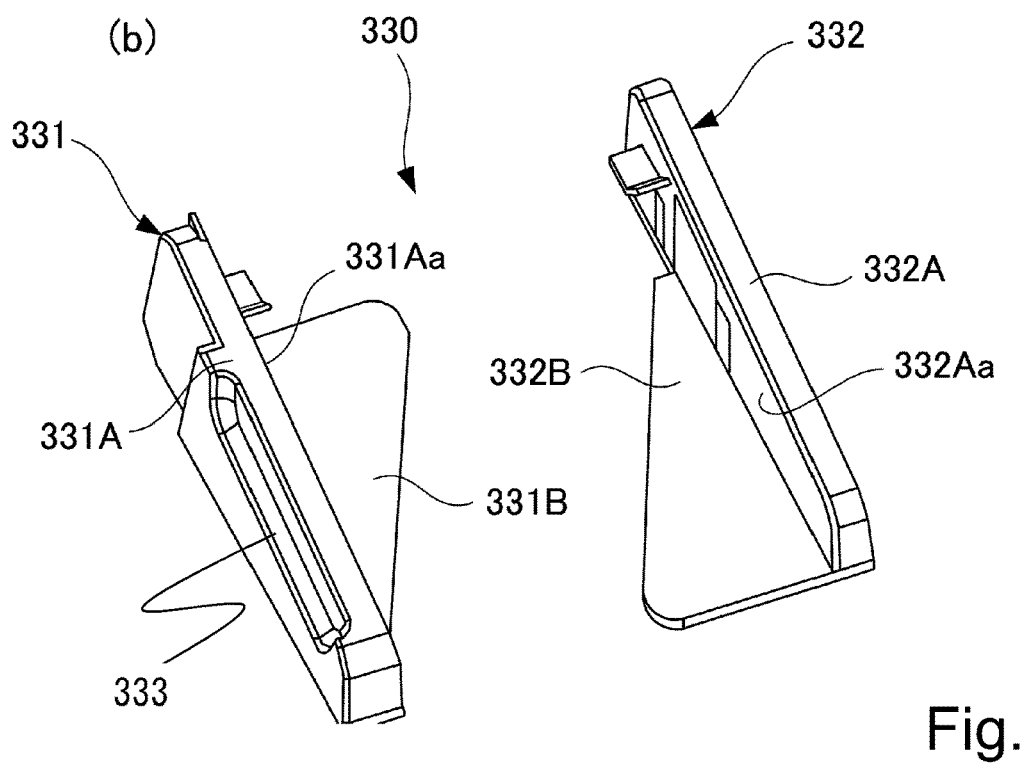

Part (a) of FIG. 10 is a perspective view of an entire ADF in a state in which a first side restricting plate and a second side restricting plate in a fourth embodiment are closed, and part (b) of FIG. 10 is a perspective view showing the first side restricting plate and the second side restricting plate in the fourth embodiment.

Figure 11:
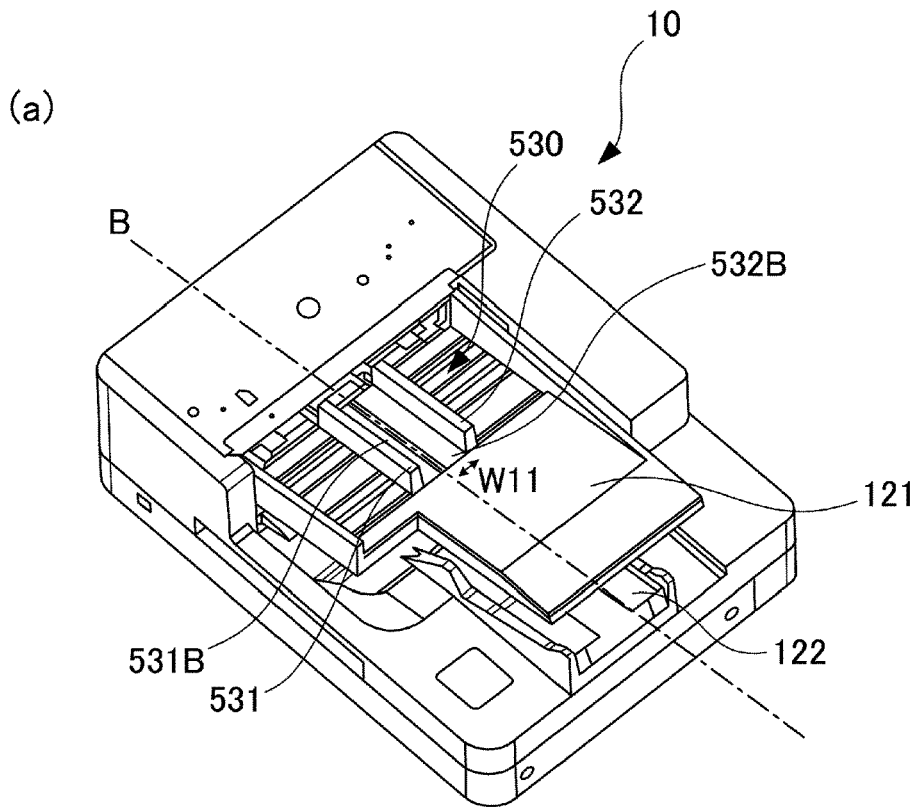
Figure 11:
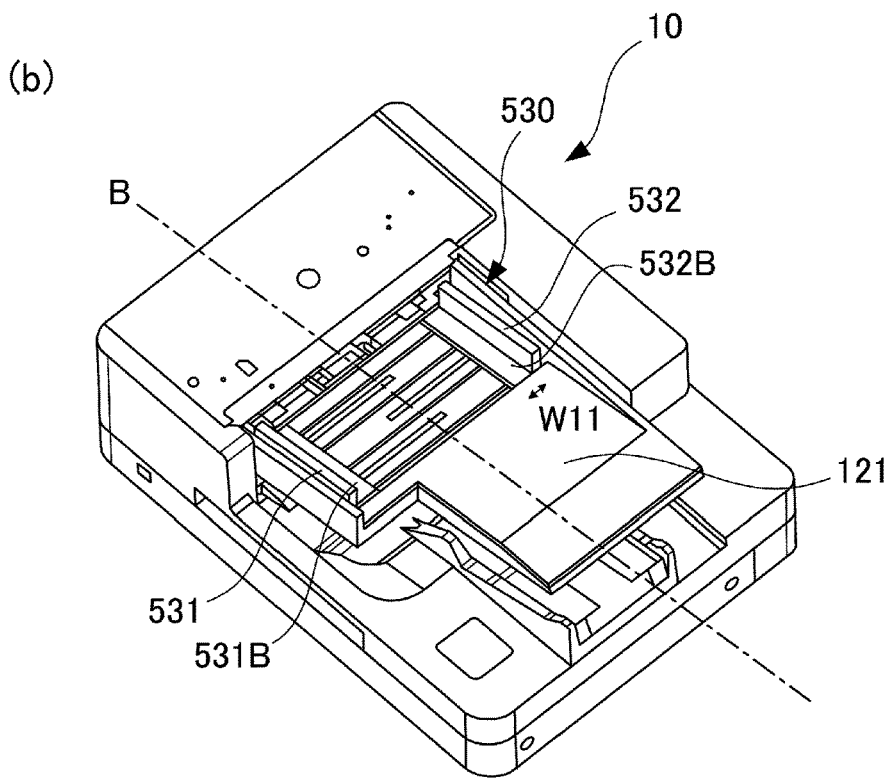

Part (a) of FIG. 11 is a perspective view of an entire ADF in a state in which a first side restricting plate provided with a short first supporting portion and a second side restricting plate provided with a short second supporting portion are closed, and part (b) of FIG. 11 is a perspective view of an entire ADF in a state in which the first side restricting plate provided with the short first supporting portion and the second side restricting plate provided with the short second supporting portion are opened.

Figure 12:
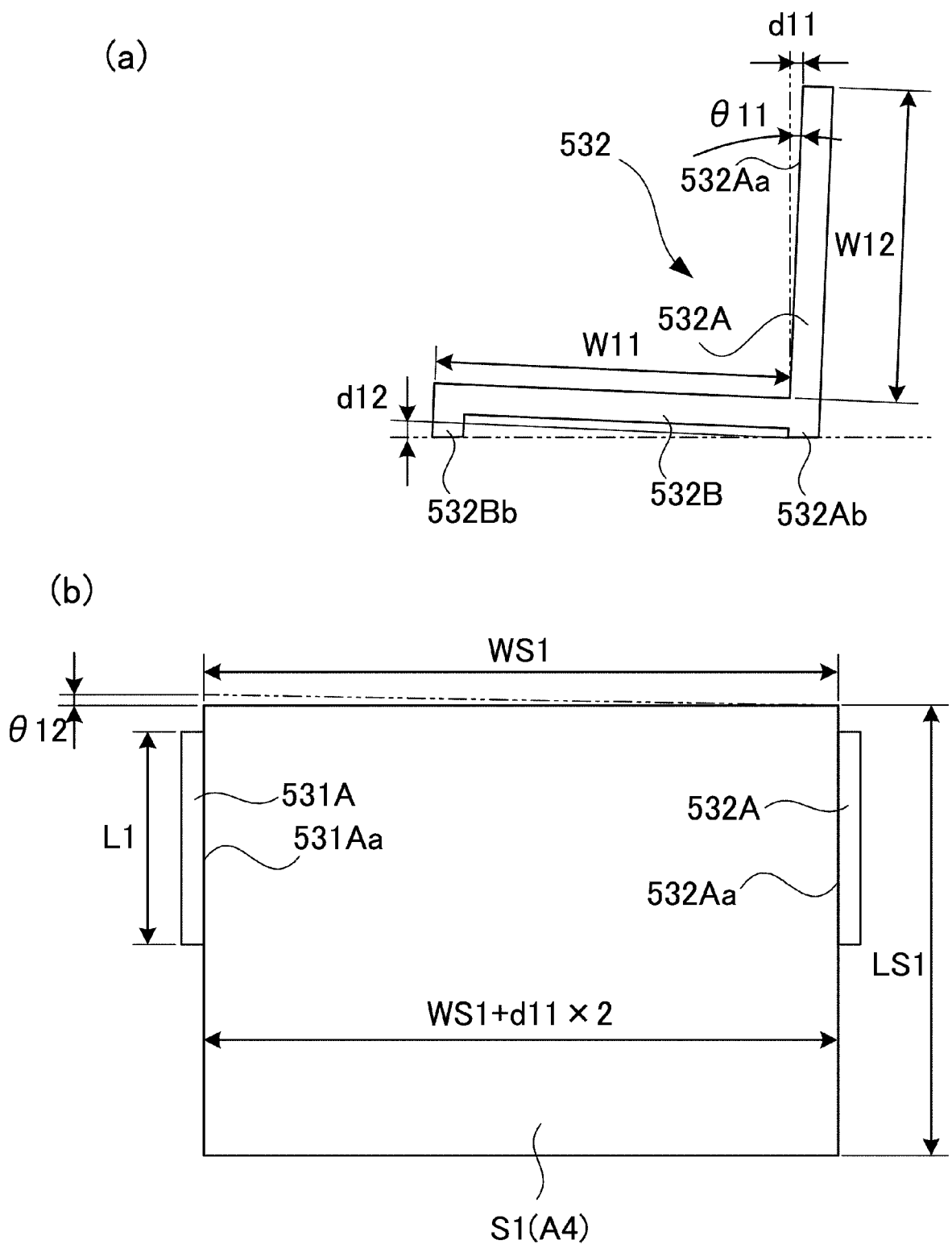

Part (a) of FIG. 12 is a schematic sectional view showing a relationship between a part tolerance, inclination of a restricting surface, and a positional tolerance of the restricting surface of the second side restricting plate provided with the short second supporting portion, and part (b) of FIG. 12 is a schematic top plan view showing a relationship between a set original and a positional tolerance between a first restricting surface and a second restricting surface in the case where the short first supporting portion and the short second supporting portion are used.

DESCRIPTION OF THE EMBODIMENTS

First Embodiment

[General Structure]

Figure 1:
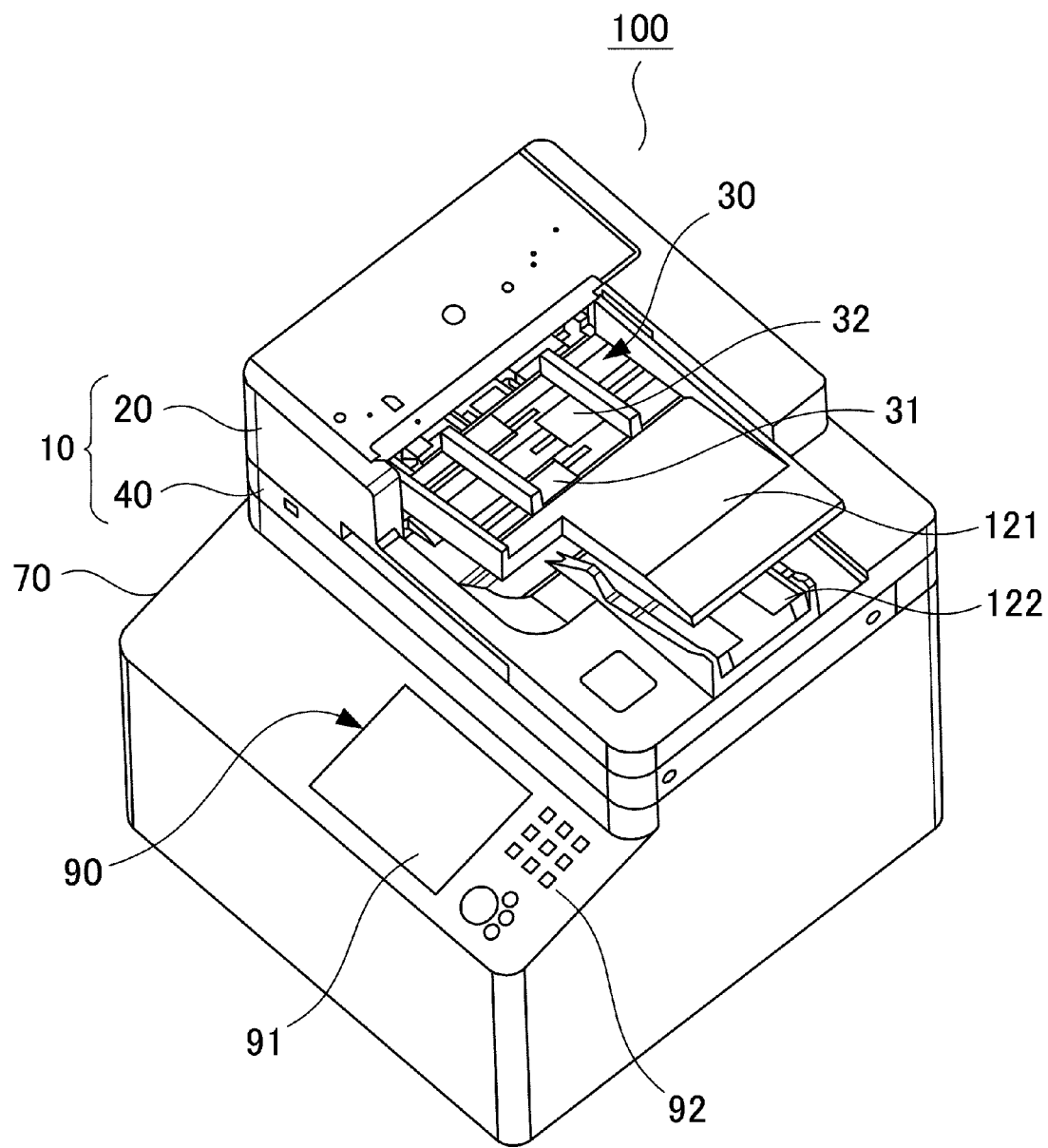
FIG. 1 is a perspective view showing an entire printer according to a first embodiment.

In the following, a first embodiment will be described. A printer 100 as an image forming apparatus according to the first embodiment is a laser beam printer of an electrophotographic type. The printer 100 includes, as shown in FIG. 1, a printer main assembly 70, an image reading apparatus 10 mounted on the printer main assembly 70, and an operating portion 90 including a display portion 91 and operation keys 92 which are capable of executing various notifications and operations. The printer main assembly 70 includes, as shown in FIG. 2, an image forming engine 60. Incidentally, in the following, the sheet includes, in addition to a plain paper, special paper such as thick paper and coated paper, a recording material having a special shape, such as an envelope and index paper, and a plastic film for an overhead projector and a cloth, and the like, and the original is also an example of the sheet.

The image forming engine 60 as an image forming portion includes, as shown in part (b) of FIG. 2, an image forming unit PU as an image forming means of an electrophotographic type and a fixing device 7. When an instruction to start an image forming operation is provided, a photosensitive drum 1 which is a photosensitive member rotates, and a drum surface thereof is electrically charged by a charging device 2. Then, an exposure device 3 modulates and outputs laser light on the basis of image data sent from the image reading apparatus 10 or an external computer, and scans the surface of the photosensitive drum 1 with the laser light, so that an electrostatic latent image is formed. This electrostatic latent image is visualized (developed) into a toner image by toner supplied from a developing device 4.

In parallel to such an image forming operation, a feeding operation for feeding, toward the image forming engine 60, a sheet stacked in an unshown cassette or on an unshown manual feeding tray is executed. The fed sheet is conveyed in conformity to progress of the image forming operation performed by the image forming unit PU. Then, the toner image carried on the photosensitive drum 1 is transferred onto the sheet by a transfer roller 5. The toner remaining on the photosensitive drum 1 after toner image transfer is collected by the cleaning device 6. The sheet on which the (unfixed) toner image is transferred is delivered to the fixing device 7 and is heated and pressed by being nipped by a roller pair. The toner is melted and fixed on the sheet, and then the sheet on which the image is fixed is discharged by a discharging means such as a discharging roller pair.

[Image Reading Apparatus]

Next, the image reading apparatus 10 will be specifically described. The image reading apparatus 10 includes, as shown in part (a) of FIG. 2, an ADF (automatic document feeder) 20 for feeding an original stacked on an original tray 121 as a stacking tray and for discharging the original onto a discharge tray 122, and a reading unit 40 for reading the original fed by the ADF 20. The ADF 20 constitutes an original feeding device for feeding the sheet as the original to the reading unit 40. The reading unit 40 includes a front surface reading unit 104 as a reading portion for reading an image on a front surface of the original. Incidentally, this ADF 20 is rotatably supported by the reading unit 40 by unshown hinges so that an original supporting platen glass 101 is openable. Further, the original which is an example of the sheet may be white paper or may also be a sheet on which an image is formed on one surface or both surfaces.

The ADF 20 includes, as a feeding portion, a pick-up roller 111 as a rotatable feeding member, and a separation driving roller 112 and a regard roller 113 which constitute a separation roller pair. The ADF 20 further includes a registration roller pair 114, a lead roller pair 115, a feeding roller pair 117 and a discharging roller pair 119. Further, the ADF 20 includes a back surface reading unit 105 as a reading portion. On the other hand, the reading unit 40 includes a platen glass 102, the original supporting platen glass 101, and a front surface reading unit 104 as an image reading means. The front surface reading unit 104 is constituted so as to be slidable (movable), i.e., is constituted so as to be movable in a sub-scan direction of an unshown reading sensor.

The original tray 121 includes, as shown in parts (a) and (b) of FIG. 3, side restricting mechanism 30 which are movable in a widthwise direction, perpendicular to a feeding direction, on a stacking surface of the original and which are used as a width restricting means for restricting a position of the original with respect to the widthwise direction of the original in contact with end portions of the original with respect to the widthwise direction. The side restricting mechanism 30 is constituted by a pair of (two), first and second side restricting plates 31 and 32 as first and second restricting members, respectively, movable in the widthwise direction. These first and second side restricting plates 31 and 32 are connected to an interrelating means 50 constituted by a rack-and-pinion mechanism which is specifically described later (parts (a) and (b) of FIG. 6). By this, one of the first side restricting plate 31 and the second side restricting plate 32 is moved, so that the other side restricting plate is moved in the widthwise direction in an interrelation manner. That is, a feeding center of the original is positioned at a center with respect to the widthwise direction. These side restricting plates 31 and 32 are constituted so as to move toward and away from the center with respect to the widthwise direction, i.e., are constituted so that the original center is in the same position as the feeding center irrespective of an original size.

Then, a reading operation of the original will be described using part (a) of FIG. 2. The image reading apparatus 10 reads image information from the original by an operation in a skimming-through reading mode in which an image of the original is scanned while feeding the original stacked on the original tray 121 by the ADF 20 and by an operation in a fixed reading mode in which the original placed on the original supporting platen glass 101 is scanned. The skimming-through reading mode is selected in the case where the original stacked on the original tray 121 is detected by an unshown original presence/absence sensor or in the case where the user explicitly designates the mode through an operating portion 90 or the like.

When the operation in the skimming-through reading mode is executed, the pick-up roller 111 lowers and contacts the uppermost original of the originals on the original tray 121. Then, the originals are fed by the pick-up roller 111 and are separated one by one in a separation nip formed by the separation driving roller 112 and the retard roller 113. In a rotation supporting structure of the retard roller 113, a torque limiter is provided, so that the retard roller 113 is rotated together with the separation driving roller 112 when the number of the fed originals is one and is not rotated when the number of the fed originals is two or more. For this reason, the retard roller 113 is capable of separating the originals one by one. Incidentally, to the retard roller 113, drive (driving force) in a direction opposite to the sheet feeding direction may also be inputted. On the other hand, in order to read the original fed simultaneously with the lowering of the pick-up roller 111, the front surface reading unit 104 is moved below the platen glass 102.

The original to be fed is fed toward the platen glass 102 by the registration roller pair 114 and the lead roller pair 115.

In the case of front surface reading, a front surface image of the original is read by the front surface reading unit 104 through the platen glass 102. A reading surface of the original is irradiated with light by an optical source for the front surface reading unit 104, and reflected light from the original surface is photoelectrically converted line by line by a light-receiving element of an unshown reading sensor. The image information photoelectrically converted is transferred to an image memory of an unshown controller. Then, the original passed through the platen glass 102 is guided to the feeding roller pair 117 and is discharged onto the discharge tray 122 by the discharging roller pair 119.

In the case of double-surface (side) reading, the front surface is read by the front surface reading unit 104 as described above, and a back surface image of the original is read by the back surface reading unit 105. Similarly, a reading surface is irradiated with light by a light source for the back surface reading unit 105, and reflected light from the original surface is photoelectrically converted line by line by a light-receiving element of an unshown reading sensor. The image information photoelectrically converted is transferred to the image memory of the controller.

On the other hand, the fixed reading mode is selected in the case where the image reading device detects the original placed on the original supporting platen glass 101 or in the case where the user explicitly designates the fixed reading mode through the operating portion 90. In these cases, the original on the original supporting platen glass 101 is not moved, so that the original is scanned with light by moving the front surface reading unit 104 along the original supporting platen glass 101. Similarly, the image information photoelectrically converted by the light-receiving element of the reading sensor of the front surface reading unit 104 is transferred to the image memory of the controller.

[Side Restricting Mechanism]

Next, a detailed structure of a side restricting mechanism 30 will be described using parts (a) and (b) of FIG. 4, parts (a) and (b) of FIG. 5 and parts (a) and (b) of FIG. 6. As shown in part (a) of FIG. 4 to part (b) of FIG. 6, the side restricting mechanism 30 is constituted by including the first side restricting plate 31, the second side restricting plate 32 and the interrelating means 50 for interrelating movement of these plates in the widthwise direction with each other. Incidentally, in the following, on the basis of a center position B which is a center line between a first restricting surface of the first side restricting plate 31 and a second restricting surface of the second side restricting plate 32, sides opposing the center position B are referred to as insides, and sides opposite from the insides are referred to as outsides. Further, when a first supporting portion 31B and a second supporting portion 32B described later, portions thereof connected integrally with a first restricting portion 31A and a second restricting portion 31A and a second restricting portion 32A, respectively, are referred to as bases, and portions opposite from the bases are referred to as free ends, and sides of the bases are referred to as base sides and sides of the free ends are referred to as free end sides.

In this first embodiment, the first side restricting plate 31 includes, as shown in part (a) of FIG. 4 and part (a) of FIG. 6, the first restricting portion 31A, the first supporting portion 31B and a first slider portion 31C. The first restricting portion 31A is provided so as to project upward from an original stacking surface 121*a* of the original tray 121. On the first restricting portion 31A, a first restricting surface 31Aa for restricting a position of a widthwise end portion of the original stacked on the original tray 121 by contacting the widthwise end portion of the original is formed. The first restricting surface 31A is disposed toward an inside between the first side restricting plate 31 and the second side restricting plate 32 so as to oppose a second restricting surface 32Aa of the second side restricting plate 32 described later. Further, at a position upstream of the first restricting portion 31A with respect to the sheet feeding direction, a grip portion capable of being gripped by a user so that the user can operate the grip portion so as to permit movement of the first side restricting plate 31 in the widthwise direction is provided.

Further, the first supporting portion 31B is formed at two positions for the (single) first restricting portion 31A. Each of the first supporting portions 31B is formed in a rectangular shape as seen from above and is formed integrally with the first restricting portion 31A at the base portion so as to extend toward the free end in the widthwise direction. An upper surface 31Ba of the first supporting portion 31B is disposed so as to be flush with the original stacking surface 121a of the original tray 121 and constitutes a stacking surface of the original. Incidentally, details of a length of the first supporting portion 31B with respect to the widthwise direction will be described later.

The first slider portion 31C is formed, as shown in parts (a) and (b) of FIG. 6, integrally with the first restricting portion 31A and the first supporting portion 31B so as to project downward on a side opposite from the upper surface 31Ba of the first supporting portion 31B. On the other hand, as shown in part (a) of FIG. 5, the original tray 121 is provided with guiding groove portions 121c formed in a groove (slit) shape extending in the widthwise direction as a longitudinal direction thereof. Further, the original tray 121 is provided with a plurality of ribs 121b projecting upward while extending in parallel to the guiding groove portions 121c. On these ribs 121b, as shown in part (a) of FIG. 5 and parts (a) and (b) of FIG. 6, a base-side slidable portion 31Ab positioned at a lower end portion of the first restricting portion 31A with respect to the widthwise direction and a free end-side slidable portion 31Bb positioned at a lower free end of the first supporting portion 31B with respect to the widthwise direction slide. Accordingly, the first side restricting plate 31 is disposed so as to be movable (slidable) in the widthwise direction relative to the original tray 121 in a manner such that the first slider portion 31c is guided by the guiding groove portion 121c while sliding on upper surfaces of the ribs 121c.

Similarly, the second side restricting plate 32 includes, as shown in part (a) of FIG. 4 and part (a) of FIG. 6, the second restricting portion 32A, the second supporting portion 32B and a second slider portion 32C. The second restricting portion 32A is provided so as to project upward from an original stacking surface 121a of the original tray 121. On the second restricting portion 32A, a second restricting surface 32Aa for restricting a position of a widthwise end portion of the original stacked on the original tray 121 by contacting the widthwise end portion of the original is formed. The second restricting surface 32A is disposed toward an inside between the first side restricting plate 31 and the second side restricting plate 32 so as to oppose the above-described first restricting surface 31Aa of the first side restricting plate 31 described later.

Further, the second supporting portion 32B is formed at a single position for the (single) second restricting portion 32A so as to be positioned between the two second supporting portions 31B of the first restricting portion 31A with respect to the feeding direction. The second supporting portion 32B is formed in a rectangular shape as seen from above and is formed integrally with the second restricting portion 32A at the base portion so as to extend toward the free end in the widthwise direction. An upper surface 32Ba of the second supporting portion 32B is disposed so as to be flush with the original stacking surface 121a of the original tray 121 and constitutes a stacking surface of the original. Incidentally, details of a length of the second supporting portion 32B with respect to the widthwise direction will be described later.

The second slider portion 32C is formed, as shown in parts (a) and (b) of FIG. 6, integrally with the second restricting portion 32A and the second supporting portion 32B so as to project downward on a side opposite from the upper surface 32Ba of the second supporting portion 32B. As described above, the original tray 121 is provided with the guiding groove portions 121e and the plurality of ribs 121b. On these ribs 121b, as shown in part (a) of FIG. 5 and parts (a) and (b) of FIG. 6, a base-side slidable portion 32Ab positioned at a lower end portion of the second restricting portion 32A with respect to the widthwise direction and a free end-side slidable portion 32Bb positioned at a lower free end of the second supporting portion 32B with respect to the widthwise direction slide. Accordingly, the second side restricting plate 32 is disposed so as to be movable (slidable) in the widthwise direction relative to the original tray 121 in a manner such that the second slider portion 32c is guided by the guiding groove portion 121c while sliding on upper surfaces of the ribs 121c.

The interrelating means 50 is constituted, as shown in part (b) of FIG. 5 and parts (a) and (b) of FIG. 6, by the rack-and-pinion mechanism disposed inside the original tray 121. The interrelating means 50 is constituted by including a first rack 51, a second rack 52, a pinion 53 and a supporting plate 54. The first rack 51 is connected to one of the first slider portions 31C of the first side restricting plate 31, and the second rack 52 is connected to the second slider portion 32C of the second side restricting plate 32. Each of these first and second racks 51 and 52 is disposed on a back side of the original tray 121 since each of the first and second slider portions 31C and 32C penetrates through the associated guiding groove portion 121c. Further, the pinion 53 not only is supported at a center shaft thereof by the supporting plate 54 fixed to the original tray 121 on the back side of the original tray 121, but also engages with the first rack 51 and the second rack 52. By this, as described above, by moving one of the first side restricting plate 31 and a second side restricting plate, the other side restricting plate is moved in the widthwise direction in interrelation with the one side restricting plate. For this reason, a constitution in which a center of the original which is restricted at opposite ends by the first restricting surface 31Aa and the second restricting surface 32Aa is disposed in the same position as a feeding center is employed. Incidentally, when the side restricting mechanism 30 is seen from above the stacking tray (original tray), a grip portion 333 and a part of the first rack 51 are provided in an overlapping position. By this, the user is capable of gripping a portion in the neighborhood of the first rack 51, so that the side restricting plate is not twisted and therefore operativity can be improved.

[Positional Tolerance of Restricting Surface Due to Part Tolerance]

Then, inclination of the first restricting surface 31Aa and the second restricting surface 32Aa and positional tolerances at upper ends thereof, which are caused by (component) part tolerances in the first side restricting plate 31 and the second side restricting plate 32 will be described. First, for example, the case where a length of each of the first supporting portion and the second supporting portion with respect to the widthwise direction is made half of a width of a business card so that opposite ends of the business card with respect to the widthwise direction can be restricted by the first and second restricting surfaces of the first and second side restricting plates, respectively, will be described. Incidentally, in the following description, description common to the first side restricting plate and the second side restricting plate will be made for the second side restricting plate as an example, and the description for the first side restricting plate will be omitted.

Parts (a) and (b) of FIG. 11 are perspective views showing an ADF on which, for example, a business card-size sheet is capable of being set. An ADF 10 includes an original tray 121 provided with a side restricting mechanism 530 including a first side restricting plate 531 and a second side restricting plate 532. For example, in the case where the business card is set on the original tray 121, there is a need that the first side restricting plate 531 and the second side restricting plate 532 are brought near to each other from positions away from each other with respect to the widthwise direction as shown in part (b) of FIG. 11 to positions between which a width of the business card is formed as shown in part (a) of FIG. 11. For this reason, the widthwise length of each of the first and second supporting portions 531B and 532B of the first and second side restricting plates 531 and 532 is formed so as to range to a center position (center line) B which is a center with respect to the widthwise direction, i.e., is half of the width of the business card with respect to the widthwise direction. Incidentally, a length of each of the first and second side restricting plates 531 and 532 is a general length L1 (part (b) of FIG. 12).

However, when the widthwise length of each of the first and second supporting portions 531 and 532 is short, there arises a problem described below. As shown in part (a) of FIG. 12, the second side restricting plate 532 includes a second restricting portion 532A including a base-side slidable portion 532Ab of a portion slidable with the original tray 121 and includes the second supporting portion 532B including a free end-side slidable portion 532Bb of a portion slidable with the original tray 121 at a free end of the second supporting portion 532B. It is assumed that a part tolerance d12 with respect to a height direction generates between the base-side slidable portion 532Ab and the free end-side slidable portion 532Bb. Then, in the case where the widthwise length of the second supporting portion 532B is W11, the second restricting surface 532Aa of the second restricting portion 532A is inclined with an angle θ11, so that a positional error d11 generates at an upper end of the second restricting surface 532Aa.

Here, also as regards the first side restricting plate 531, similarly as in the case of the second side restricting plate 532, assuming that the part tolerance of the free end-side slidable portion relative to the base-side slidable portion is d12, the positional error d11 also generates at an upper end of the first restricting surface 531 As shown in part (b) of FIG. 12. Then, it is assumed that a bundle of A4-size originals S1 each having a length LS1 with respect to the feeding direction and a width WS1 with respect to the widthwise direction is set. Then, with respect to the width WS1 of the original S1, at upper ends of the first restricting surface 531Aa and the second restricting surface 532Aa, the widthwise length is represented by "WS1+d11×2". For this reason, even when the originals S1 set between the first side restricting plate 531 and the second side restricting plate 532 are restricted in the length L1 of each of the first restricting surface 531Aa and the second restricting surface 532Aa, a gap as a positional error of d11×2 generates. For that reason, an angle θ12 causes inclination of tan θ=d11×2/L1 at the maximum, i.e., oblique movement generating from the time of a start of feeding of the originals (initial oblique movement) becomes large.

Incidentally, the case where with respect to each of the first side restricting plate 531 and the second side restricting plate 532, a part tolerance of the free end-side slidable portion relative to the base-side slidable portion is reverse to the part tolerance of the above-described case, i.e., the case where the free end-side slidable portion 532Bb is lower than the base-side slidable portion 532Ab (i.e., the case where the part tolerance is −d12) also exists. In this case, the positional error of upper ends of the first restricting surface 531Aa and the second restricting surface 532Aa is −d11, i.e., the upper ends are inclined inward. In this case, in the case where the user sets the bundle of originals S1, when the user strongly presses the first side restricting plate 531 and the second side restricting plate 532 inward, upper originals S1 of the bundle are strongly nipped and thus impose a feeding load. Then, there is a liability that improper feeding such that the originals S1 cannot be fed by the pick-up roller 111 is caused. Further, when the user sets the bundle of originals S1, in the case where the user does not strongly press the first side restricting plate 531 and the second side restricting plate 532 inward, the positional error of lower ends of the first restricting surface 531Aa and the second restricting surface Aa is d11. For that reason, similarly as described above, at a lower portion of the bundle of originals S1, oblique movement (initial oblique movement) generating from the time of the start of the feeding of the originals S1 becomes large.

Then, inclination of the first restricting surface 31Aa and the second restricting surface 32Aa and a positional tolerance at the upper ends of the restricting surfaces, which are caused due to the part tolerance of the first side restricting plate 31 and the second side restricting plate 32 in this first embodiment will be described. The widthwise length of each of the first supporting portion 31B and the second supporting portion 32B of the first side restricting plate 31 and the second side restricting plate 32, respectively is, as shown in part (a) of FIG. 7, for example, a length W1 which is the length (width) of the business card with respect to the widthwise direction. In summary, the widthwise length is two times the widthwise length of the second side (bottom) portion 532B shown in part (a) of FIG. 12.

That is, the first supporting portions 31B and the second supporting portion 32B are disposed alternately in different positions with respect to the feeding direction. For that reason, in a state in which the first side restricting plate 31 and the second side restricting plate 32 are brought closest to each other, a free end of the first supporting portion 31B contacts the second restricting surface 32Aa, and a free end of the second supporting portion 32B contacts the first restricting surface 31Aa. In other words, the first supporting portions 31B and the second supporting portion 32B are disposed so as to cross the center position B which is a center with respect to the widthwise direction in the state in which the first side restricting plate 31 and the second side restricting plate 32 are brought closest to each other. Accordingly, in the state in which the first side restricting plate 31 and the second side restricting plate 32 are brought closest to each other, as seen in the feeding direction, the first side restricting plate 31 and the second side restricting plate 32 overlap with each other.

In the thus-constituted second side restricting plate 32, it is assumed that as shown in part (a) of FIG. 7, a part tolerance d1 with respect to a height direction generates between the base-side slidable portion 32Ab of the portion slidable on the original tray 121 and the free end-side slidable portion 32Bb of the portion slidable on the original tray 121. Then, the widthwise length of the second supporting portion 32B is W1, and therefore, the second restricting surface 32Aa of the second restricting portion 32A is inclined with an angle θ1, so that the upper end of the second restricting surface 32Aa having a length W2 with respect to the height direction, a positional error generates by d1. That is, it is assumed that the part tolerance d2 is equal to the above-described part tolerance d12 (part (a) of FIG. 12) and that the length W2 with respect to the height direction is equal to the above-described length W12 (part (a) of FIG. 12). Then, the widthwise length W1 of the second supporting portion 32B is twice the widthwise length W11, and therefore, the angle θ is half of the angle θ11 and the positional error d1 is also half of the positional error d11.

Further, similarly also in the first side restricting plate 31, even when the part tolerance d12 of the free end-side slidable portion (part (b) of FIG. 5) 31Bb relative to the base-side slidable portion 31Ab generates, the positional error generating at the upper end of the first restricting surface 31Aa as shown in part (b) of FIG. 7 is d1. Further, it is assumed that the user sets a bundle of A4-size originals S1 of LS1 in length with respect to the feeding direction and WS1 in width with respect to the widthwise direction. Then, with respect to a width WS1 of the original S1, at the upper ends of the first restricting surface 31Aa and the second restricting surface 32Aa, a distance with respect to the widthwise direction is a distance of "WS1+d1×2" which is half of a distance of "WS1+d11×2". For this reason, the originals S1 set between the first side restricting plate 31Aa and the second side restricting plate 32Aa generate a gap of a positional error d1×2 in a state in which the originals S1 are restricted along the length l1 between the first restricting surface 31Aa and the second restricting surface 32Aa, but the positional error d1×2 is half of the above-described positional error d11×2. For that reason, the angle θ2 of the originals S1 results in inclination of tan θ=d11×2/L1 at the maximum, i.e., a degree of the (initial) oblique movement generating from the time of the start of the feeding of the originals S1 is reduced.

Further, in the case where in the first side restricting plate 31 and the second side restricting plate 32, the part tolerance of the free end-side slidable portion relative to the base-side slidable portion is reverse, i.e., the case where the free end-side slidable portion 32Bb is lower than the base-side slidable portion 32Ab (the case where the part tolerance is −d2) also exists. Even in this case, the positional error at the upper ends of the first restricting surface 31Aa and the second restricting surface 32Aa is −d1, so that the upper ends are inclined inward. However, in the case where the user sets the bundle of originals S1, even when the user strongly presses the first side restricting plate 31 and the second side restricting plate 32 inward, a distance in which the upper originals S1 of the bundle are strongly nipped is half, so that the feeding load is reduced. By this, a degree of occurrence of the improper feeding such that the originals S1 cannot be fed by the pick-up roller 111 is also reduced. Further, in the case where the user sets the bundle of originals S1, when the user does not strongly press the first side restricting plate 31 and the second side restricting plate 32 inward, the positional error at the lower ends of the first restricting surface 31Aa and the second restricting surface 32Aa becomes d1. Even in this case, the gap generating in the widthwise direction for the lower originals S1 of the bundle is the positional error d1×2, so that the degree of the oblique movement generating from the time of the start of the feeding of the lower originals S1 of the bundle is reduced.

As described above, in the state in which the first supporting portion 31B and the second supporting portion 32B are disposed so as to cross the center position B (part (b) of FIG. 4) between the first restricting surface 31Aa and the second restricting surface 32Aa in the state in which the first restricting surface 31Aa and the second restricting surface 32Aa are brought closest to each other. That is, the free end of the first supporting portion 31B crosses the center position B and is positioned on the second restricting surface 32Aa side, and a free end of the second supporting portion 32B crosses the center position B and is positioned on the first restricting surface 31Aa side.

By this, the length between the above-side slidable portion 31Ab (32Ab) and the free end-side slidable portion 31Bb (32Bb) disposed at opposite ends of the portion slidable on the original tray 121 on the first side restricting plate 31 (the second side restricting plate 32) is W1. Then, the length W1 can be made longer than the length W11 which is half of the length in the state in which the first restricting surface 31Aa and the second restricting surface 32Aa are brought closest to each other. For this reason, even when the part tolerance d2 generates between the base-side slidable portion 32Ab (32Ab) and the free end-side slidable portion 31Bb (32Bb), the inclination angle θ1 of the first restricting surface 31Aa (the second restricting surface 32Aa) can be made small. By this, the positional error d1 at the upper end of each of the first restricting surface 31Aa and the second restricting surface 32Aa can be made small. For that reason, in the case where the first restricting surface 31Aa and the second restricting surface 32Aa are inclined inward, a feeding resistance of the set originals is reduced, so that a degree of occurrence of the improper feeding can be reduced. Further, in the case where the first restricting surface 31Aa and the second restricting surface 32Aa are inclined outward, a degree of inclination of the set originals with respect to the original feeding direction can be reduced, so that a degree of occurrence of the oblique movement of the originals during the feeding of the originals can be reduced. By this, a degree of inclination of the image read by the front surface reading unit 104 and by the back surface reading unit 105 can be reduced, so that it is possible to realize prevention of a lowering in image reading quality.

Second Embodiment

Then, a second embodiment in which the above-described first embodiment is partially changed will be described using parts (a) and (b) of FIG. 8. Incidentally, in the following description of this second embodiment, portions similar to those in the above-described first embodiment are represented by the same reference numerals or symbols and will be omitted from description.

In the second embodiment, compare with the first embodiment, shapes of the first supporting portion and the second supporting portion are changed. Specifically, as shown in parts (a) and (b) of FIG. 8, a side restricting mechanism 130 in the second embodiment includes a first side restricting plate 131 and a second side restricting plate 132 similarly as in the first embodiment. Similarly, the first side restricting plate 131 includes a first restricting portion 131A having a first restricting surface 131Aa and includes a first supporting portion 131B. The second side restricting plate 132 includes a second restricting portion 132A having a second restricting surface 132Aa and includes a second supporting portion 132B.

Each of the first supporting portion 131B and the second supporting portion 132B in the second embodiment is constituted by a single part and is formed in a rectangular shape as seen from above, and the first and second supporting portions 131B and 132B are disposed in different positions with respect to the feeding direction. Further, in a state in which the first restricting surface 131Aa and the second restricting surface 132Aa are brought closest to each other, free ends of the first supporting portion 131B and 132B cross a center position (center line) B and have lengths with respect to the widthwise direction such that the free ends thereof contact the second restricting surface 132Aa and the first restricting surface 131Aa, respectively. That is, the first supporting portion 131B and the second supporting portion 132B have shapes which overlap with each other as seen in the feeding direction and do not overlap with each other as seen in the widthwise direction in the state in which the first restricting surface 131Aa and the second restricting surface 132Aa are brought closest to each other. For this reason, similarly as in the first embodiment, a degree of inclination of the first restricting surface 131Aa and the second restricting surface 132Aa caused by a part tolerance is reduced, so that a positional error at upper ends of these restricting surfaces is also reduced.

Incidentally, other constitutions, actions and effects in the second embodiment are similar to those in the first embodiment, and therefore, will be omitted from description.

Third Embodiment

Then, a third embodiment in which the above-described first embodiment is partially changed will be described using parts (a) and (b) of FIG. 9. Incidentally, in the following description of this third embodiment, portions similar to those in the above-described first embodiment are represented by the same reference numerals or symbols and will be omitted from description.

In the third embodiment, compare with the first embodiment, shapes of the first supporting portion and the second supporting portion are changed. Specifically, as shown in parts (a) and (b) of FIG. 9, a side restricting mechanism 230 in the third embodiment includes a first side restricting plate 131 and a second side restricting plate 132 similarly as in the first embodiment. Similarly, the first side restricting plate 231 includes a first restricting portion 231A having a first restricting surface 231Aa and includes a first supporting portion 231B. The second side restricting plate 232 includes a second restricting portion 232A having a second restricting surface 232Aa and includes a second supporting portion 232B.

Each of the first supporting portion 231B and the second supporting portion 232B in the third embodiment is constituted by two (plurality of) parts and is formed in a rectangular shape as seen from above, and the two first supporting portions 231B and the two second supporting portions 232B are alternately disposed in different positions with respect to the feeding direction and thus are formed in a so-called comb shape. Further, in a state in which the first restricting surface 231Aa and the second restricting surface 232Aa are brought closest to each other, free ends of the first supporting portion 231B and 232B cross a center position (center line) B and have lengths with respect to the widthwise direction such that the free ends thereof contact the second restricting surface 232Aa and the first restricting surface 231Aa, respectively. That is, the first supporting portion 231B and the second supporting portion 232B have shapes which overlap with each other as seen in the feeding direction and do not overlap with each other as seen in the widthwise direction in the state in which the first restricting surface 231Aa and the second restricting surface 232Aa are brought closest to each other. For this reason, similarly as in the first embodiment, a degree of inclination of the first restricting surface 231Aa and the second restricting surface 232Aa caused by a part tolerance is reduced, so that a positional error at upper ends of these restricting surfaces is also reduced.

Incidentally, other constitutions, actions and effects in the third embodiment are similar to those in the first embodiment, and therefore, will be omitted from description.

Fourth Embodiment

Then, a fourth embodiment in which the above-described first embodiment is partially changed will be described using parts (a) and (b) of FIG. 10. Incidentally, in the following description of this fourth embodiment, portions similar to those in the above-described first embodiment are represented by the same reference numerals or symbols and will be omitted from description.

In the fourth embodiment, compare with the first embodiment, shapes of the first supporting portion and the second supporting portion are changed. Specifically, as shown in parts (a) and (b) of FIG. 10, a side restricting mechanism 330 in the fourth embodiment includes a first side restricting plate 331 and a second side restricting plate 332 similarly as in the first embodiment. Similarly, the first side restricting plate 331 includes a first restricting portion 331A having a first restricting surface 331Aa and includes a first supporting portion 331B. The second side restricting plate 332 includes a second restricting portion 332A having a second restricting surface 332Aa and includes a second supporting portion 332B.

Each of the first supporting portion 331B and the second supporting portion 332B in the fourth embodiment is constituted by a single part and is formed in a triangular shape as seen from above. The triangular shape is such that the first restricting surface 331Aa or the second restricting surface 332Aa constitutes a base of a triangle. That is, each of the first supporting portion 331B and the second supporting portion 332B is formed in a so-called taper shape such that a length with respect to the feeding direction thereof becomes small toward a free end side thereof with respect to the widthwise direction. Further, in a state in which the first restricting surface 331Aa and the second restricting surface 332Aa are brought closest to each other, free ends of the first supporting portion 331B and 332B cross a center position (center line) B and have lengths with respect to the widthwise direction such that the free ends thereof contact the second restricting surface 332Aa and the first restricting surface 331Aa, respectively. That is, the first supporting portion 331B and the second supporting portion 332B have shapes which overlap with each other as seen in the feeding direction in the state in which the first restricting surface 331Aa and the second restricting surface 332Aa are brought closest to each other. For this reason, similarly as in the first embodiment, a degree of inclination of the first restricting surface 331Aa and the second restricting surface 332Aa caused by a part tolerance is reduced, so that a positional error at upper ends of these restricting surfaces is also reduced.

Incidentally, other constitutions, actions and effects in the fourth embodiment are similar to those in the first embodiment, and therefore, will be omitted from description.

Other Embodiments

In the above-described first to fourth embodiments, the constitution in which both the first supporting portion and the second supporting portion cross the center position B in the state in which the first side restricting plate and the second side restricting plate are brought closest to each other was described. However, the present invention is not limited thereto, and a constitution in which only the first supporting portion (or the second supporting portion) crosses the center position B may also be employed. Even in such a case, an effect such that a positional error at an upper end of the supporting portion including the restricting surface crossing the center position B is reduced can be achieved.

Further, in the above-described first to fourth embodiments, the constitution in which the free end of the first supporting portion contacts the second restricting surface and the free end of the second supporting portion contacts the first restricting surface in the state in which the first side restricting plate and the second side restricting plate are brought closest to each other was described. However, the free end of the first supporting portion or the free end of the second supporting portion may only be required to slightly cross the center position B. Even in such a case, compared with a constitution in which the free end of the supporting portion does not cross the center position B, a positional error-reducing effect can be achieved. In other words, when at least a part of the first supporting portion and the second supporting portion crosses the center position B, compared with the constitution in which the free end of the supporting portion does not cross the center position B, the positional error-reducing effect can be achieved. Further, in this case, a portion where the first side restricting plate and the second side restricting plate contact each other in the state in which these side restricting plates are brought closest to each other is not limited to the free end of the first supporting portion or the second supporting portion. For example, it would be considered that any part of the first supporting portion of the first side restricting plate (or the second supporting portion of the second side restricting plate) is contacted to a predetermined part or the like such as a projection of the original tray. Further, it would be also considered that the first rack (or the second rack) fixed to the first side restricting plate (or the second side restricting plate) is contacted to the predetermined part such as the projection of the original tray.

Further, in the above-described first to third embodiments, the constitution in which the shapes of the first supporting portion and the second supporting portion are the rectangular shape as seen from above was described, and in the above-described fourth embodiment, the constitution in which the shapes of the first supporting portion and the second supporting portion are the triangular shape as seen from above was described. However, the shapes are not limited thereto, but may also be any shape if when the first side restricting plate and the second side restricting plate move in the widthwise direction, movement thereof is not impaired and the free end of the first supporting portion or the second supporting portion crosses the center position B. For example, a shape of a boundary between the first supporting portion and the second supporting portion in the state in which the first side restricting plate and the second side restricting plate are brought closest to each other may also be an arcuate shape or a stepped shape. A gap (interval) may also be provided between the first supporting portion and the second supporting portion.

Further, in the above-described first to fourth embodiments, the inclination of the first restricting surface and the second restricting surface due to the part tolerance between the base-side slidable portion and the free end-side slidable portion in the first supporting portion and the second supporting portion, and the positional error at upper ends of the first restricting surface and the second restricting surface were described. However, the present invention is not limited thereto, and for example, the slidable portions of the first supporting portion and the second supporting portion, slidable on the upper surface of the original tray may also have a flat surface shape such that the slidable portions surface-contact the upper surface of the original tray. That is, the present invention is applicable to the case where the shape of the slidable portions of the first supporting portion and the second supporting portion cause a difference, due to the part tolerance, in height with respect to the up-down direction particularly between the base side and the free end side.

Further, in the above-described first to fourth embodiments, the constitution in which the rack-and-pinion mechanism was used as an interrelation mechanism for interrelating the first side restricting plate and the second side restricting plate with each other was described. However, the present invention is not limited thereto. For example, a mechanism for interrelating the first and second side restricting plates with each other by a combination of a belt and pulleys may also be used, i.e., any mechanism may be used when the mechanism has an interrelating function.

Further, in the above-described first to fourth embodiments, the constitution in which the sheet feeding device is provided in the image reading apparatus was described. However, the present invention is not limited thereto. The sheet feeding device may also be a manual feeding tray, a feeding cassette, and the like, which are provided with the first side restricting plate and the second side restricting plate between which sheets as the recording materials are capable of being set. Even in this case, the degree of the oblique movement is reduced and a degree of deterioration in positional accuracy in the case where the images are formed on the sheets by the image forming engine 60 can be reduced, so that reduction of a degree of deterioration in positional accuracy can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-020191 filed on Feb. 7, 2020, which is hereby incorporated by reference herein in its entirety.

What is claimed is:
1. A sheet feeding device comprising:
a stacking tray configured to stack a sheet;
a feeding portion configured to feed the sheet stacked on said stacking tray;
a first restricting member which includes a first restricting surface for restricting one end side of the sheet provided on an upper surface of said stacking tray and a first supporting portion for supporting said first restricting surface in contact with the upper surface of said stacking tray and which is movable in a widthwise direction of the sheet perpendicular to a feeding direction of the sheet;

a second restricting member which includes a second restricting surface for restricting the other end side of the sheet, opposite from said one end side of the sheet, provided on the upper surface of said stacking tray and a second supporting portion for supporting said second restricting surface in contact with the upper surface of said stacking tray and which is movable in the widthwise direction of the sheet perpendicular to the feeding direction of the sheet; and interrelating means configured to interrelate said first restricting member and said second restricting member with each other so that with respect to the widthwise direction of the sheet, a distance from a center line, of said stacking tray, extending in the feeding direction of the sheet to said first restricting surface and a distance from the center line to said second restricting surface are equal to each other, wherein in a state in which said first restricting surface and said second restricting surface are brought closest to each other, a part of said first supporting portion is positioned on a second restricting surface side with respect to the center line, and a part of said second supporting portion is positioned on a first restricting surface side with respect to the center line.

2. A sheet feeding device according to claim 1, wherein in the state in which said first restricting surface and said second restricting surface are brought closest to each other, said first supporting portion and said second supporting portion are formed so as to overlap with each other as seen in the feeding direction of the sheet and so as not to overlap with each other as seen in the widthwise direction of the sheet.

3. A sheet feeding device according to claim 1, wherein each of said first supporting portion and said second supporting portion is formed in a rectangular shape as seen from above said stacking tray.

4. A sheet feeding device according to claim 1, wherein said first supporting portion and said second supporting portion are formed so as to have the same width in the feeding direction of the sheet.

5. A sheet feeding device according to claim 1, wherein said first restricting member includes a plurality of said first supporting portions, and wherein with respect to the feeding direction of the sheet, said second supporting portion is positioned between said first supporting portions.

6. A sheet feeding device according to claim 1, wherein said first restricting member includes a plurality of said first supporting portions, and said second restricting member includes a plurality of said second supporting portions, and wherein with respect to the feeding direction of the sheet, said first supporting portions and said second supporting portions are alternately provided.

7. A sheet feeding device according to claim 1, wherein in the state in which said first supporting portion and said second supporting portion are brought closest to each other, said first supporting portion and said second supporting portion are formed in a shape such that said first supporting portion and said second supporting portion at least partially overlap with each other and that with respect to the widthwise direction of the sheet, a width of each of said first supporting portion and said second supporting portion with respect to the feeding direction of the sheet becomes narrow toward the center line.

8. A sheet feeding device according to claim 1, wherein said first supporting portion and said second supporting portion are formed in a triangular shape such that a side where each of said first supporting portion and said second supporting portion is positioned is the base of the triangular shape as seen from above said stacking tray.

9. A sheet feeding device according to claim 1, wherein said first restricting member includes a grip portion configured to be gripped by a user so that the user is capable of moving the sheet in the widthwise direction of the sheet, and wherein the grip portion is provided upstream of said first restricting member with respect to the feeding direction of the sheet.

10. A sheet feeding device according to claim 1, wherein a free end position of said first supporting portion with respect to the widthwise direction of the sheet is formed in a shape such that a width of said first supporting portion becomes large toward a downstream side of the feeding direction of the sheet, and wherein a free end position of said second supporting portion with respect to the widthwise direction of the sheet is formed in a shape such that a width of said second supporting portion becomes small toward the downstream side of the feeding direction of the sheet.

11. A sheet feeding device according to claim 1, wherein said interrelating means includes a first rack member provided on said first restricting member, a second rack member provided on said second restricting member, and a pinion member engaging with said first rack member and said second rack member, and wherein said grip portion and a part of said first rack member are provided in an overlapping position as seen from above said stacking tray.

12. An image reading apparatus comprising:
a sheet feeding device according to claim 1; and
a reading portion configured to read an image on a sheet fed by said sheet feeding device.

13. An image forming apparatus comprising:
an image reading apparatus according to claim 12; and
an image forming portion configured to form the image, read by said image reading apparatus, on another sheet.

14. An image forming apparatus comprising:
a sheet feeding device according to claim 1; and
an image forming portion configured to form an image on a sheet fed by said sheet feeding device.

* * * * *